United States Patent
Kemp

(10) Patent No.: US 11,982,066 B2
(45) Date of Patent: May 14, 2024

(54) HELICAL PILE WITH HEAT EXCHANGER

(71) Applicant: Hubbell Incorporated, Shelton, CT (US)

(72) Inventor: Timothy Michael Kemp, Hannibal, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 805 days.

(21) Appl. No.: 16/761,437

(22) PCT Filed: Nov. 2, 2018

(86) PCT No.: PCT/US2018/059010
§ 371 (c)(1),
(2) Date: May 4, 2020

(87) PCT Pub. No.: WO2019/090116
PCT Pub. Date: May 9, 2019

(65) Prior Publication Data
US 2021/0002843 A1    Jan. 7, 2021

Related U.S. Application Data

(60) Provisional application No. 62/581,675, filed on Nov. 4, 2017.

(51) Int. Cl.
*E02D 5/56* (2006.01)
*E21B 7/20* (2006.01)
(Continued)

(52) U.S. Cl.
CPC ............... *E02D 5/56* (2013.01); *E21B 7/205* (2013.01); *E21B 10/44* (2013.01); *F24T 10/17* (2018.05);
(Continued)

(58) Field of Classification Search
CPC ....... F24T 10/17; F24T 50/00; F24T 2010/53; F25B 2313/002; F25B 23/006;
(Continued)

(56) References Cited

U.S. PATENT DOCUMENTS 3,579,670 A    5/1971    Frank
5,011,336 A    4/1991    Hamilton et al.
(Continued)

FOREIGN PATENT DOCUMENTS

| CN | 104695431 A | * 6/2015 |
| JP | 2006052588 | 8/2004 |
| JP | 2007315742 | 12/2007 |

OTHER PUBLICATIONS

Translation of CN-104695431-A. Date Jun. 2015.*
(Continued)

*Primary Examiner* — Mickey H France
(74) *Attorney, Agent, or Firm* — Wissing Miller LLP

(57) ABSTRACT

A helical pile including a heat exchanger is described. The pile is formed from a lead section and one or more extension sections. The interior of the lead and extension sections are hollow and form a heat exchanger cavity. At the lower end of the lead section is a helical blade. Rotation of the lead section causes the helical blade to screw into the ground, thus pulling the lead section downward. Extension sections are added to the lead section and the pile is rotated until it is installed to a desired depth. The pile includes an inflow tube extending a predetermined distance into the heat exchanger cavity and an outflow port connected with the heat exchanger cavity. In operation, a heat carrying fluid is pumped into the inflow tube from a heat source or sink, for example, a heat pump for a building heating and cooling system. The fluid exits the tube at a point near the bottom of the heat exchanger cavity. The fluid flows upward through the heat exchange cavity and exchanges heat with the
(Continued)

surrounding soil. The fluid flows out through the outflow port and back to the heat source or sink.

20 Claims, 17 Drawing Sheets

(51) Int. Cl.
*E21B 10/44* (2006.01)
*F24T 10/17* (2018.01)
*F24T 50/00* (2018.01)
*E02D 5/52* (2006.01)
*F24T 10/00* (2018.01)
*F28D 20/00* (2006.01)
*F28D 21/00* (2006.01)

(52) U.S. Cl.
CPC .............. *F24T 50/00* (2018.05); *E02D 5/523* (2013.01); *E02D 5/526* (2013.01); *F24T 2010/53* (2018.05); *F25B 2313/002* (2013.01); *F28D 20/0052* (2013.01); *F28D 2021/0019* (2013.01); *F28D 2021/0035* (2013.01); *Y02E 10/10* (2013.01)

(58) Field of Classification Search
CPC ......... F28D 20/0052; F28D 2021/0019; F28D 2021/0035; Y02E 10/10; E02D 5/56; E02D 5/523; E02D 5/526; E21B 7/205; E21B 10/44

See application file for complete search history.

(56) References Cited

U.S. PATENT DOCUMENTS

| | | | |
|---|---|---|---|
| 5,139,368 A | 8/1992 | Hamilton et al. | |
| 5,171,107 A | 12/1992 | Hamilton et al. | |
| 7,905,165 B1 | 3/2011 | Turos | |
| 8,662,794 B2 | 3/2014 | Atchley et al. | |
| 2010/0200192 A1* | 8/2010 | Consigny ................ | F24T 10/17 165/45 |
| 2011/0094720 A1 | 4/2011 | Wang et al. | |
| 2014/0110082 A1* | 4/2014 | Suver ..................... | F24T 10/17 165/45 |
| 2016/0209083 A1* | 7/2016 | Yu ........................... | F24T 10/10 |
| 2017/0218590 A1 | 8/2017 | Raposo et al. | |

OTHER PUBLICATIONS

International Search Report and Written Opinion mailed in PCT/US18/59010 dated Jan. 16, 2019 (9 pages).
International Preliminary Report on Patentability issued in PCT/US2018/059010 dated May 5, 2020 (8 pages).

* cited by examiner

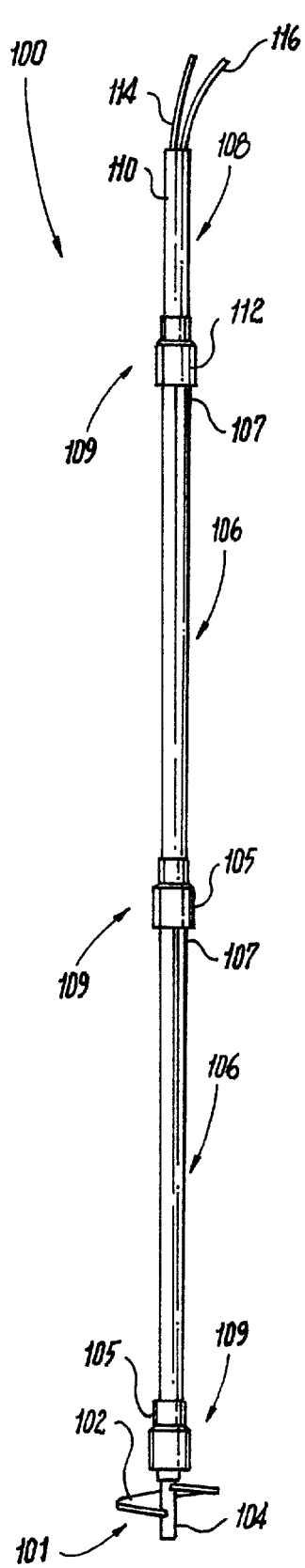
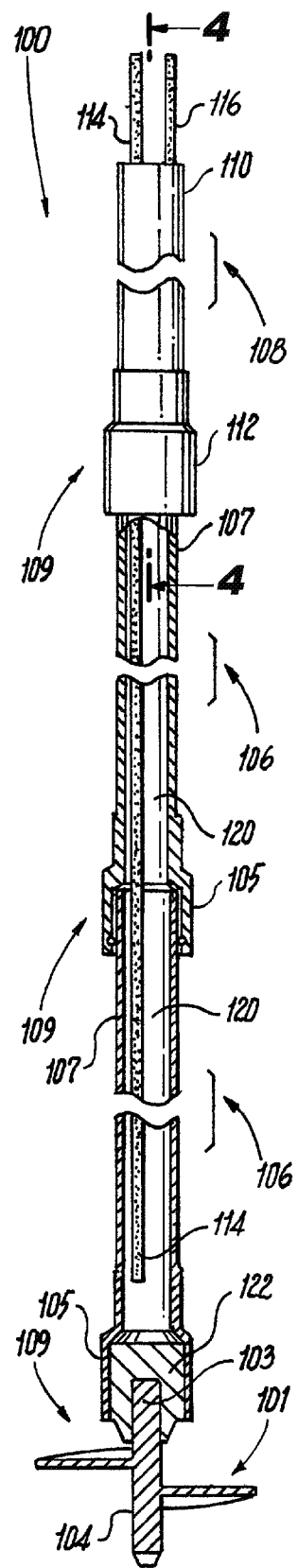
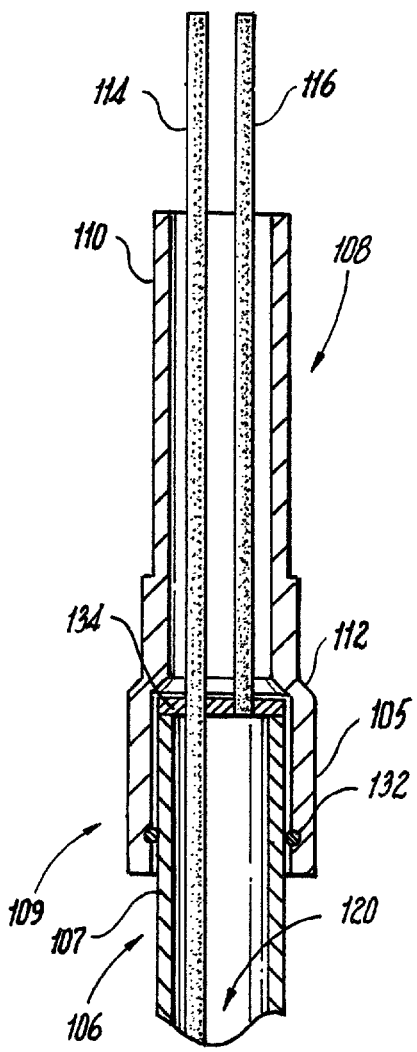
Fig. 2
Fig. 3
Fig. 4

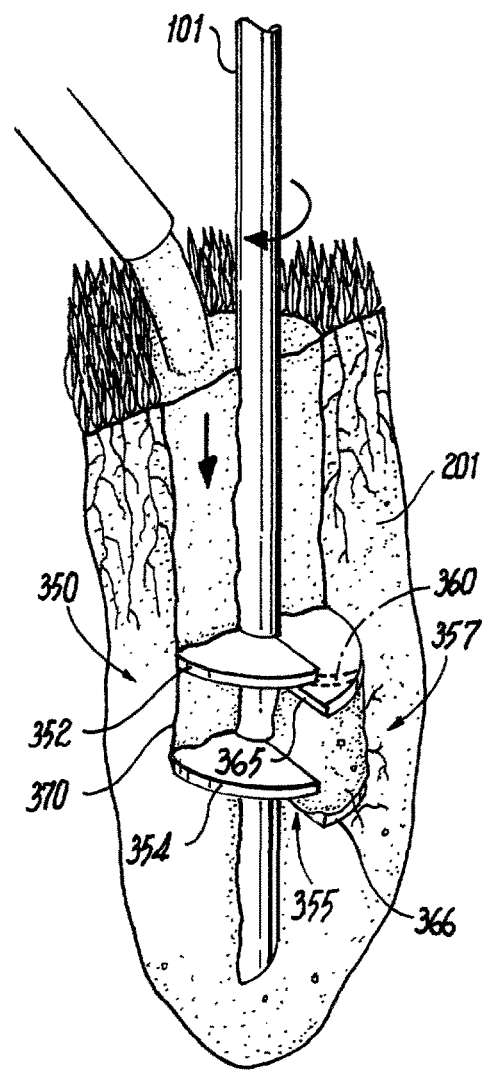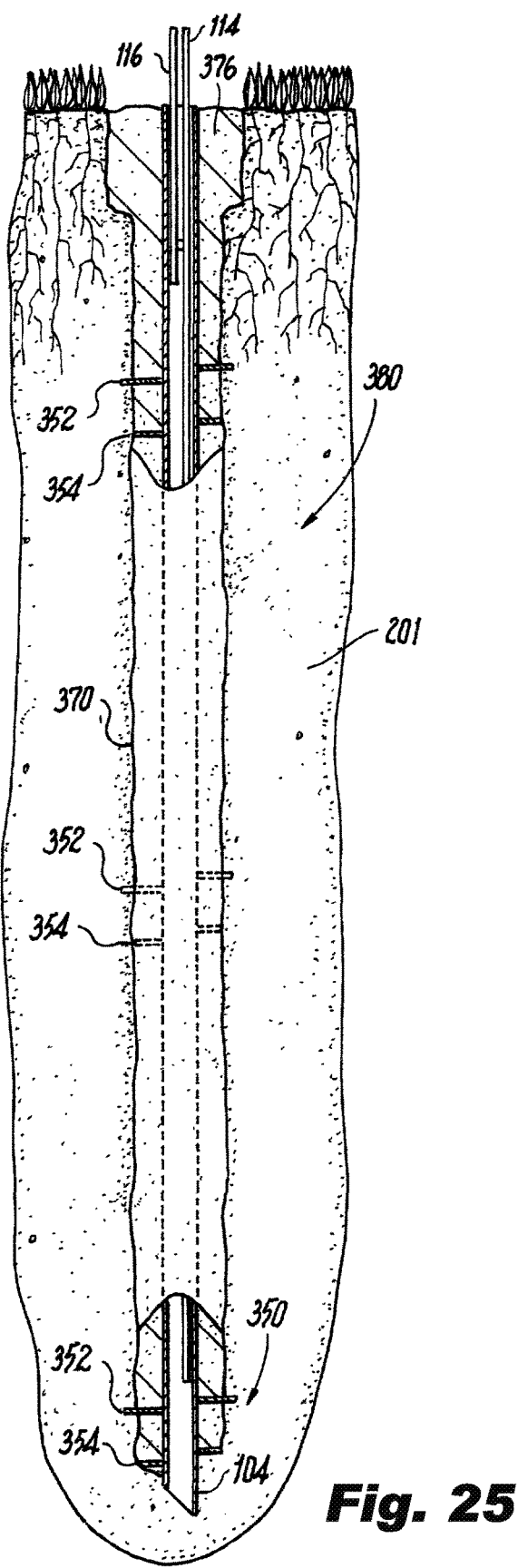
Fig. 24
Fig. 25

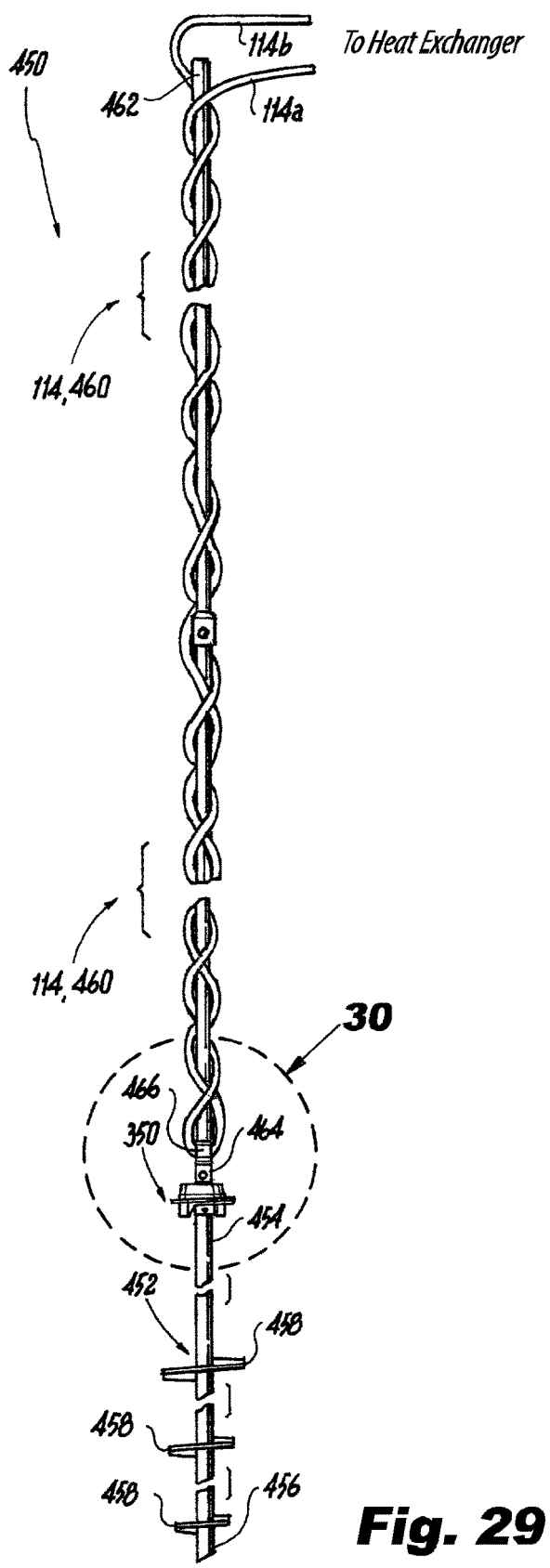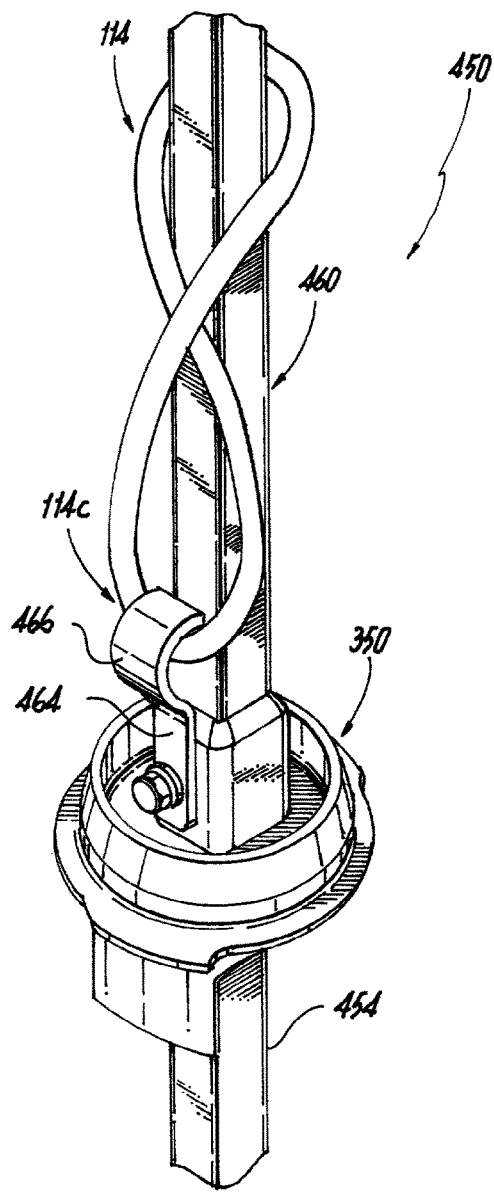
Fig. 29
Fig. 30

HELICAL PILE WITH HEAT EXCHANGER

CROSS-REFERENCE TO RELATED APPLICATIONS

This application is a 371 of PCT/US2018/059010 filed on Nov. 2, 2018, published on May 9, 2019 under publication number WO 2019/090116, which claims priority benefits from U.S. Patent Application Ser. No. 62/581,675, filed Nov. 4, 2017 both of which are incorporated herein in their entirety by reference.

BACKGROUND

Field

The present disclosure relates generally to helical piles, and more particularly, the present disclosure relates to helical piles forming part of a geothermal exchange system with a path for the flow of fluid through the helical pile to exchange heat with adjacent soil.

Description of the Related Art

Heating and cooling costs represent a significant portion of the operating expense for a building. One method for heating and cooling buildings is to provide a heat pump that mechanically extracts heat from the surrounding environment and delivers it to the interior of the building to heat it, and/or that extracts heat from the interior of the building and delivers it to the surrounding environment to cool the building. Heat pumps can exchange heat with surrounding air, as is done with a typical home air conditioning or heat pump systems. A more efficient way to absorb and/or disperse heat energy is to use a geothermal system that uses the ground near a building as the source and/or sink for heat.

Foundations for buildings and other structures require stable connection to the ground. One method for securing foundations is to provide piles that extend below ground so as to connect the foundation with the ground and to underlying stable strata. Piles may be formed above ground and then driven into the ground, for example, by repeated impact by a pile driver.

For many applications, a driven pile is impractical. To drive a pile into the ground, a pile driver must be brought to the construction site. Pile drivers require significant headroom. In areas where adjacent buildings and other structures do not allow sufficient headroom, driven piles are difficult to install. In addition, pile drivers can create significant vibration. Seismic disturbance caused by a pile driver can adversely affect businesses and residents near a construction site and can cause damage to adjacent structures. Thus, pile drivers may add significant cost and complexity to a construction project.

A helical pile does not require a pile driver. A helical pile is formed from a lead that has a helical blade affixed to its lower end. The lead is rotated, causing the helical blade to screw into the ground. As the lead is screwed into the ground, extension(s) may be coupled with the lead, allowing the lead to go deeper below ground level until the pile is installed to the desired depth.

SUMMARY

The present disclosure provides embodiments of geothermal exchange systems that include a stable mechanical geological interface, e.g., one or more helical piles, in fluid communication with a thermal exchanging system. Each of the one or more helical piles are capable of supporting a load and includes a cavity through which fluid can circulate. The thermal exchanging system include a fluid pump, a thermal exchanger and a thermomechanical device. The one or more helical piles are in fluid communication with the thermal exchanging system using inlet and outlet tubes that allow fluid to be circulated between the one or more helical piles and the thermal exchanging system to exchange heat with soil surrounding the one or more helical piles. The present disclosure also provides exemplary embodiments of helical piles that can be used with geothermal exchange systems.

In an exemplary embodiment, a helical pile according to the present disclosure includes at least one shaft, at least one helical load bearing plate, a first tube and a second tube. The at least one shaft has a proximal end, a distal end and a cavity extending along at least a portion of the interior of the shaft. The at least one helical load bearing plate is secured to the shaft. The first tube extends a first predetermined distance into the cavity, and the second tube extends a second predetermined distance into the cavity. The cavity is sealed except for the first tube and the second tube, such that when the helical pile is driven into soil, fluid can be circulated between the first tube, the cavity and the second tube so that heat can be exchanged between the fluid and the soil. The helical pile may also include a mounting bracket assembly that is secured to the proximal end of the shaft and capable of supporting at least a portion of a structure. In an exemplary embodiment, the mounting bracket assembly includes a pile adapter, a bracket assembly and a bracket stabilizing assembly. The pile adapter has a pile receiving flange that can be mated with the proximal end of the shaft, and a central aperture that is aligned with the pile receiving flange that permits the first and second tubes to pass through the pile adapter. The bracket assembly has a mounting bracket capable of supporting a structure and at least one mounting plate secured to the mounting bracket and used to secure the mounting bracket assembly to the pile adapter. The bracket stabilizing assembly is used to fix the orientation of the bracket assembly relative to the terminating extension shaft.

In another exemplary embodiment, a helical pile according to the present disclosure includes a lead shaft, at least one soil displacement assembly, at least one extension shaft and a tube. The lead shaft has a lead head portion, a lead end portion and at least one helical load bearing plate secured to the lead shaft. The at least one soil displacement assembly is secured to the lead shaft preferably in close proximity to the lead head portion. The at least one extension shaft has an extension head portion and an extension end portion that can be coupled to the lead head portion. The tube has an inlet end and an outlet end and is coiled around the at least one extension shaft such that the tube extends from the extension head portion toward the extension end portion.

In an exemplary embodiment, a geothermal exchange system includes a thermal exchanging system and at least one helical pile such as the helical piles noted above.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a side elevation view of an exemplary embodiment of a helical pile according to the present disclosure, illustrating a lead and a series of extensions attached to the lead;

FIG. 3 is a cross-sectional view of the lead and first two extensions of the helical pile of FIG. 2;

FIG. 4 is a cross-sectional view of a head portion of an upper most line extension and a terminating extension of the helical pile of FIG. 3 taken along line 4-4, illustrating a coupling joint at an end portion of the terminating extension and a head portion of the line extension;

FIG. 24 is a top perspective view of the soil displacement pile lead of FIG. 18 being driven into the soil with the soil displacement assembly creating a cavity in which filler is being poured;

FIG. 25 is a side elevation view in partial cross section of a helical pile of FIG. 18 with grout poured into the bore created by the soil displacement assemblies;

FIG. 29 is a side elevation view of another exemplary embodiment of a helical pile according to the present disclosure;

FIG. 30 is a side elevation view of a portion of the helical pile of FIG. 29 encased within grout to form a grout column.

DETAILED DESCRIPTION

Because helical piles may be installed deep underground, they are typically in contact with geologic layers that are thermally stable and store geothermal energy. Providing helical piles having a geothermal heat exchange function to; 1) transfer heat from man-made structures the piles support, such as homes and office buildings, to the soil, or 2) transfer heat from the soil to man-made structures. Providing helical piles with such a geothermal heat exchange function can improve the efficiency of existing systems used to heat and cool such man-made structures without significantly increasing the cost and complexity of such heating and cooling systems. In addition, providing helical piles with such a geothermal heat exchange function significantly reduces the cost to heat or cool such man-made structures.

Figure 1:
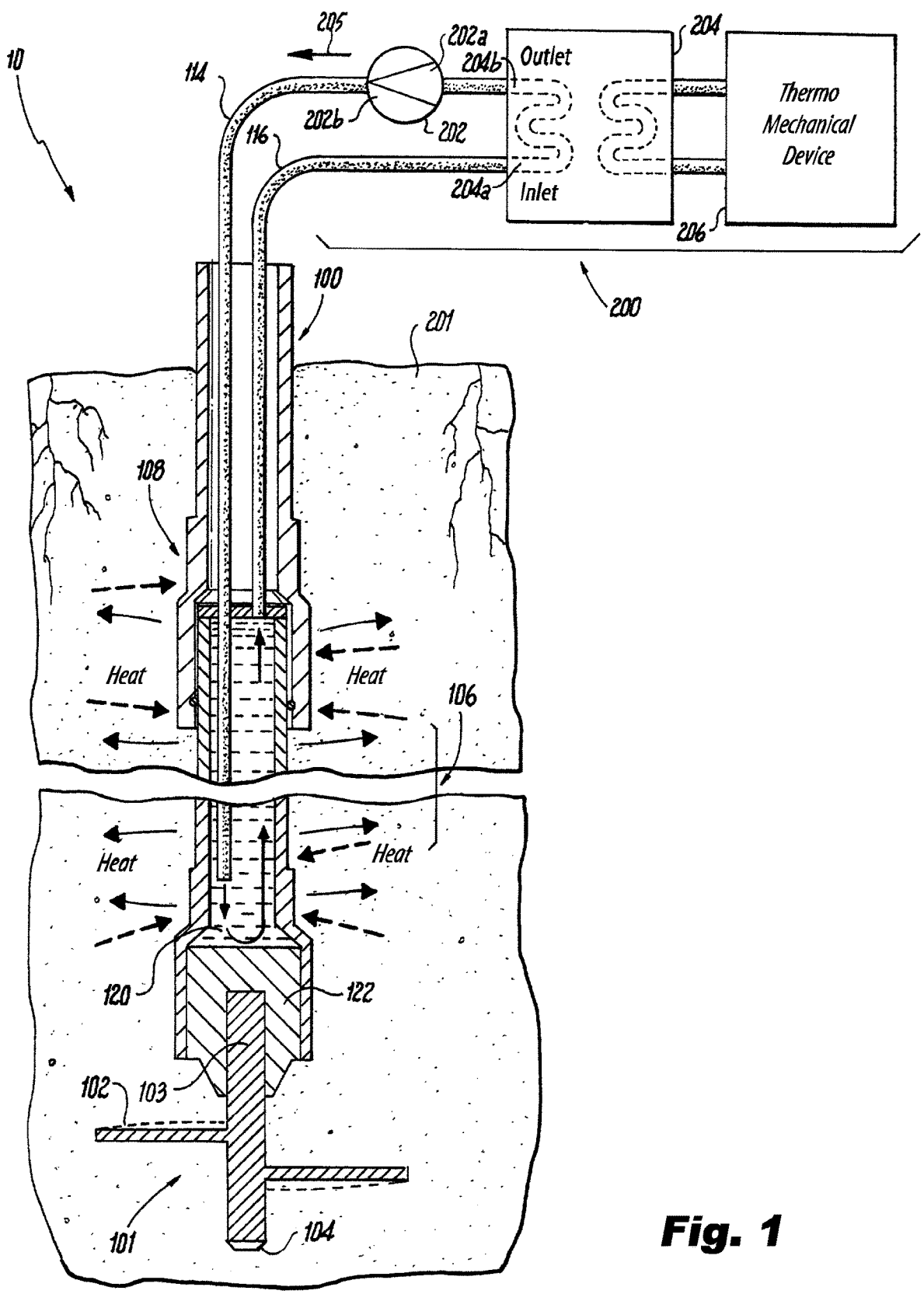
FIG. 1 is a schematic representation of an exemplary embodiment of a geothermal exchange system according to the present disclosure using that includes an exemplary embodiment of the helical pile according to the present disclosure.

Referring to FIG. 1, an exemplary embodiment of a geothermal exchange system according to the present disclosure is shown. The geothermal exchange system 10 includes a helical pile 100 and a thermal exchanging system 200. For ease of description, the geothermal exchange system 10 may also be referred to herein as the "system" and the thermal exchanging system 200 may also be referred to herein as the "exchanging system."

The helical pile 100 is used to provide a geothermal heat sink/source for the exchanging system 200. The helical pile 100 is installed in the ground 201 as will be described below. Inlet and outlet conduits or tubes 114 and 116, respectively, extend from the helical pile as shown and connect to the exchanging system 200. In the exemplary embodiment shown, the inlet tube 114 extends within a cavity 120 of the helical pile 100 almost to the distal end (e.g., the bottom) of the cavity 120, as shown. However, the inlet tube 114 may terminate anywhere along the length of the cavity 120 so long as it is distal to the outlet tube 116. The outlet tube 116 extends slightly within the cavity 120 almost at the proximal end (e.g., the top) of the cavity 120, as shown. However, the outlet tube may terminate anywhere along the length of the cavity 120 so long as it is proximal to the inlet tube 114. The inlet and outlet tubes 114 and 116, respectively, may be made from a flexible material, such as a flexible polymer, an elastomer, a rubber, or the like, or the inlet and outlet tubes 114 and 116 may be made from a rigid or semi rigid material, such as a metal, a hard polymer, or the like. Using a stiffer material to form the inlet and outlet tubes 114 and 116 facilitates easier insertion of the tubes into the cavity 120 of the helical pile 100, and prevents the tubes from snagging against an inside wall of the cavity 120 or against baffles or fins included in the cavity.

Continuing to refer to FIG. 1, the exchanging system 200 in this exemplary embodiment includes a fluid pump 202, a thermal exchanger 204 and a thermomechanical device 206. The thermal exchanger 204 may be, for example, a heat exchanger or other device capable of exchanging heat from one medium, e.g., a solid or fluid, to another medium, e.g., a solid or fluid. The thermomechanical device 206 may be a heat pump, air conditioner, refrigerator or other device capable of heating or cooling an area or structure by transferring heat using mechanical devices, apparatus or machines. For ease of description, the thermal exchanger 204 may be also referred to herein as a "heat exchanger" and the thermomechanical device 206 may be also referred to herein as a "heat pump."

The exchanging system 200 is coupled to the helical pile 100 via the inlet and outlet tubes 114 and 116. The outlet tube 116 of the helical pile 100 connects with an inlet 204a of a first side of the heat exchanger 204. An outlet 204b of the first side of the heat exchanger 204 connects to an inlet 202a of the fluid pump 202. The outlet 202b of the fluid pump 202 connects with the inlet tube 114. A fluid, e.g., water, from the inlet tube 114 fills the cavity 120 within the helical pile 100, which is described in more detail below, and returns to the heat exchanger 204 via outlet tube 116. The fluid pump 202 circulates this fluid between the helical pile 100 and the heat exchanger 204 in the direction shown by arrow 205. More specifically, the water flows through the inlet tube 114 and exits the tube near the bottom of the cavity 120 and fills the cavity 120. The hydrostatic pressure of the water in the cavity 120 pushes water out through outlet tube 116 into the inlet 204a of the first side of the heat exchanger 204. As the fluid flows through the cavity 120, heat can transfer either; 1) from the fluid through the walls of the helical pile 100 and into the ground 201 to cool the fluid, or 2) from the ground 201 through the walls of the helical pile 100 to heat the fluid. The thermomechanical device 206, e.g., a heat pump, is connected to a second side of the heat exchanger 204 as is known. It is noted that the flow of fluid can also be reversed, with fluid being pumped into cavity 120 through tube 116 and flowing out through tube 114.

According to the exemplary embodiments of the present disclosure, the fluid may be any suitable material that remains fluid at the temperatures at which the helical pile 100 can operate, is non-corrosive and that is capable of maintaining a consistent viscosity throughout the temperature variances. Non-limiting examples of such fluid include water, pure water, aqueous salt solutions, refrigerants and/or combinations thereof. Non-limiting examples of suitable refrigerants include Freon, oil, antifreeze compounds, such as propylene glycol, ethylene glycol and the like. The fluid may also include beneficial additives, such as corrosion inhibitors.

During cold weather, in order to provide or supplement heat to a structure, e.g., a building (not shown), the heat pump 206 draws heat from the heat exchanger 204, which in turn draws heat from the fluid circulating through the helical pile 100. Because the helical pile 100 is in thermal contact with the ground or soil 201, heat is drawn into the fluid within the cavity 120 through the walls of the helical pile 100 forming the cavity 120. This heat is delivered to the heat pump 206 through the heat exchanger 204. During warm weather, in order to provide or supplement air conditioning to a structure, e.g., a building, the heat pump 206 extracts heat from the building, for example, by using an evaporator (not shown). The heat pump 206 delivers the extracted heat to the heat exchanger 204 which, in turn transfers that heat to the circulating fluid. The extracted heat is then delivered to the ground in thermal contact with the walls of the cavity 120.

It is noted that the exemplary embodiment of the geothermal exchange system 10 shown in FIG. 1 includes a single helical pile 100 in fluid communication with the exchanging system 200. However, the present disclosure contemplates that the system 10 may include a plurality of helical piles 100 connected to the exchanging system 200 in, for example, a grid or random pattern or combinations thereof. Controllers (not shown), such as valves, can be connected between each helical pile 100 or sets of helical piles 100 and the exchanging system 200 to control the flow of fluid between the helical piles 100 and the exchanging system 200. More specifically, the controllers determine which helical piles 100 are to be active in the system 10. By activating or deactivating the helical piles 100 connected to the system 10, the capacity of the system 10 can be adjusted to meet demand. The controllers can be manually activated or deactivated, or the controllers could be automatically activated or deactivated, or the controllers can be remotely activated.

Turning now to FIGS. 2-4, an exemplary embodiment of a helical pile 100 according to the present disclosure is shown. A helical pile 100 typically comprises square shafts or round shafts sequentially joined together. The shafts are typically hollow, but they may also be solid shafts. The bottom most shaft of a helical pile is known as the lead 101, which has a lead head portion 103 and a lead end portion 104. Additional shafts attached to the lead 101 are known as extensions 106. For ease of description and clarity, the phrase "line extension" refers to the extensions 106 which are between the lead and the upper most extension 108, which is referred to as the terminating extension. Each line extension 106 has an extension head portion 107 and an extension end portion 105. The terminating extension 108 has a terminating extension head portion 110 and a terminating extension end portion 112. The lead head portion 103 connects to an extension end portion 107, the terminating extension end portion 112 or to a pile drive system head, seen in FIG. 15, which is used to rotate the lead 101 and extensions 106 and 108, if used, to drive the helical pile 100 into the soil or ground 201. The lead 101, line extensions 106 and terminating extension 108 can be made of metal, e.g., steel or galvanized steel, or carbon fiber, or other suitable material known in the art.

Referring to FIGS. 2 and 3, the lead end portion 104 of the lead 101 is configured to first penetrate the soil or ground 201 and terminates with a tapered or beveled edge at its distal end. The lead 101 typically has one or more spaced apart load bearing helical plates 102 arranged on the shaft of lead 101 typically in the lead end portion 104 to penetrate the soil 201. The load bearing helical plates 102 on the lead 101 may have the same diameter or the load bearing helical plates 102 may have different diameters that are, for example, in a tapered arrangement. As an example, the tapered arrangement may be such that the smallest diameter load bearing helical plate 102 is closest to the tapered tip of the lead 101, and the largest load bearing helical plate 102 is at a distance away from the tapered tip. The load bearing helical plates 102 on the lead 101 are spaced apart at a distance sufficient to promote individual plate load bearing capacity. Typically, the distance between the helical plates 102 is three times the diameter of the smallest load bearing helical plate 102 on the shaft of the lead 101. The diameter of the load bearing helical plates 101 in conventional helical piles 100 may range from between about 6 inches and about 16 inches depending upon the load the helical pile 100 is to carry.

Figure 11:
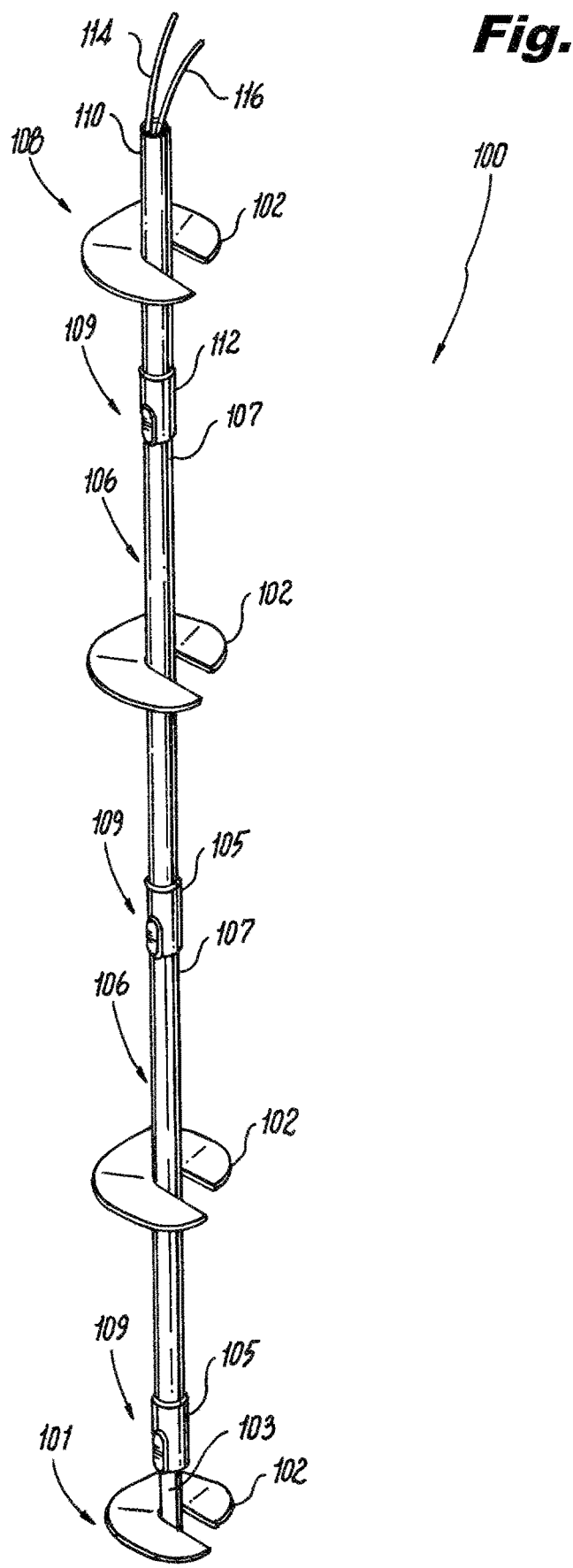
FIG. 11 is a top perspective view of another exemplary embodiment of a helical pile according to the present disclosure, illustrating a lead and a series of extensions attached to the lead where the extensions include at least one load bearing helical plate attached to each extension.
Figure 15:
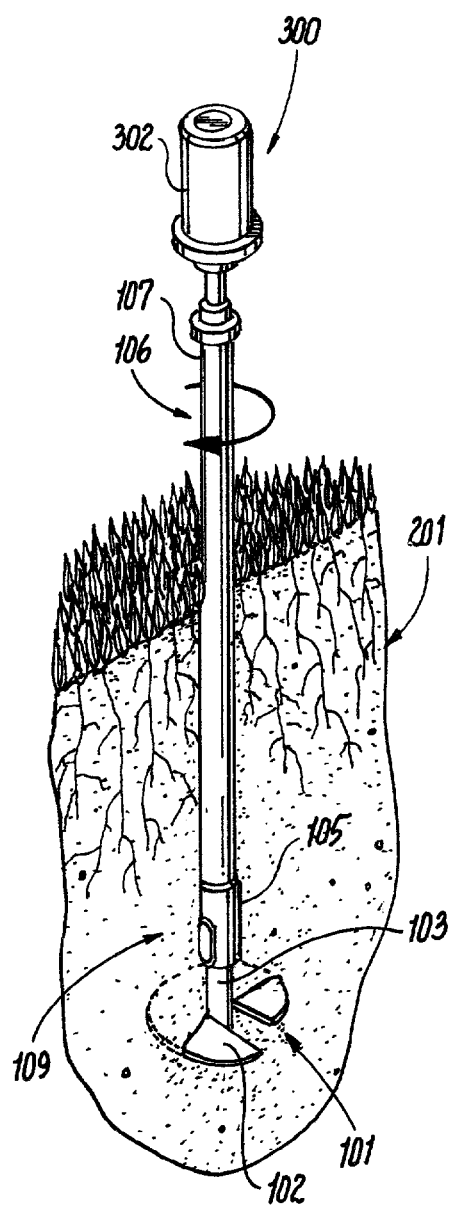
FIGS. 15-17 are top perspective views illustrating the installation of an exemplary embodiment of a helical pile according to the present disclosure into the ground.
Figure 16:
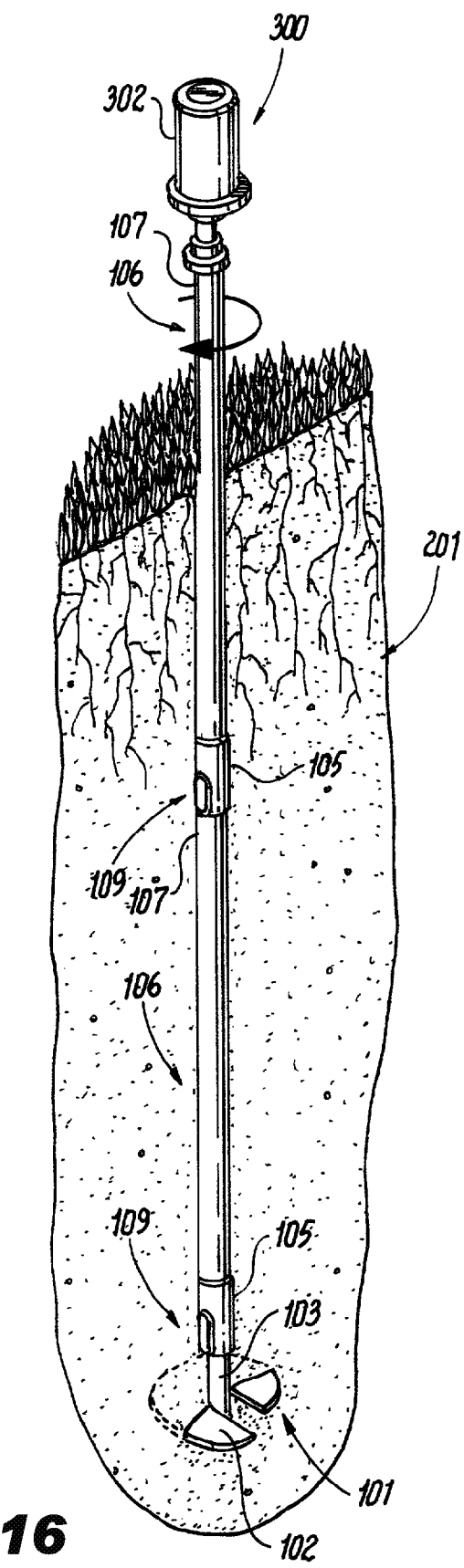
Figure 17:
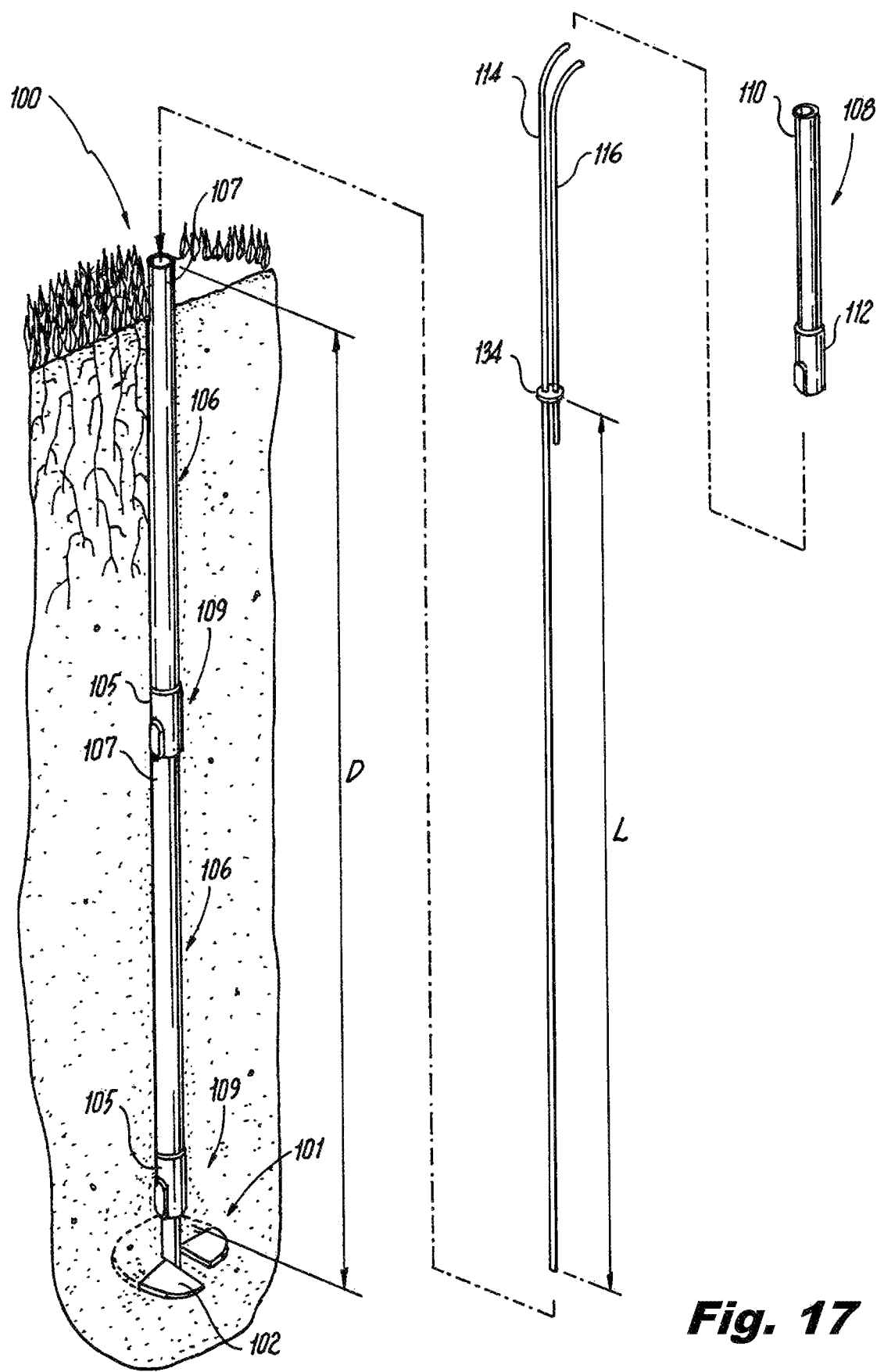
Figure 18:
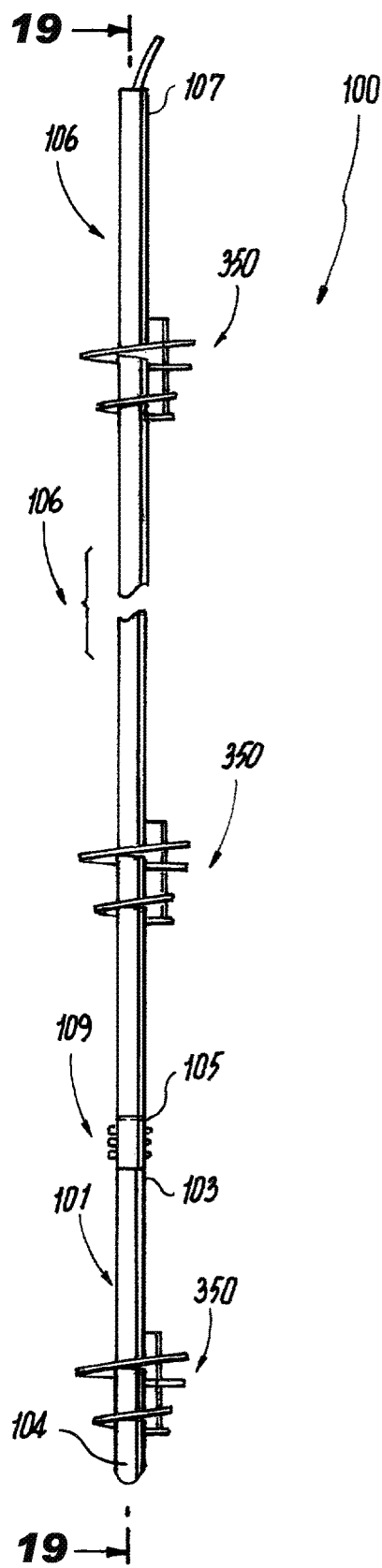
FIG. 18 is a side elevation view of another exemplary embodiment of a helical pile according to the present disclosure, illustrating a lead and a series of extensions attached to the lead and a soil displacement assembly attached to the lead and each extension.
Figure 19:
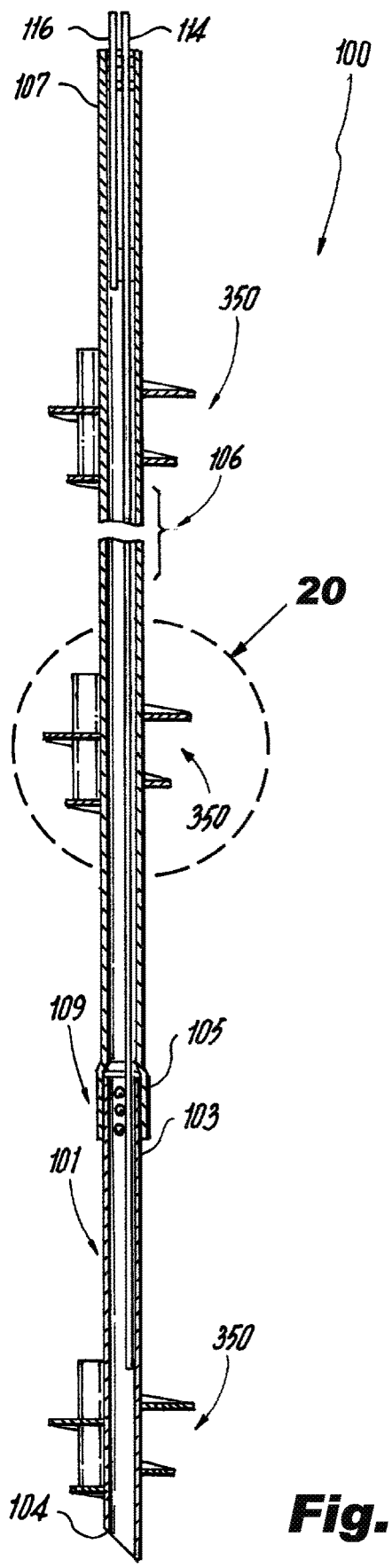
FIG. 19 is a cross-sectional view of the helical pile of FIG. 18 taken along line 19-19.

Helical piles 100 are installed by applying torque, via a pile drive system 300, shown in FIGS. 15 and 16, first attached to the shaft at the lead head 103 that causes the load bearing helical plates 102 to rotate and screw into the soil 201 with minimal disruption to the surrounding soil 201, as shown in FIG. 15. As the lead 101 penetrates the soil, one or more line extensions 106 may have to be added to the helical pile 100 so that the pile 100 can achieve the desired depth and load capacity, as shown in FIGS. 16 and 17. Each line extension 106 has an extension end portion 105 and an extension head portion 107 that are configured to connect to a lead head portion 103, another line extension 106, the terminating extension 108 or to the pile drive system 300. The lines extensions 106 may also have one or more load bearing helical plates 102 spaced apart along the length of the shaft of the line extension 106 at a distance sufficient to promote individual plate 102 load bearing capacity, as seen in FIG. 11. The distance is typically three times the diameter of the smallest load bearing helical plate 102 directly adjacent on the shaft of the helical pile 100. The diameter of the load bearing helical plates 102 in conventional helical pile 100 extensions may range from between about 6 inches and about 16 inches depending upon the load the pile 100 is to carry. Typically, the load bearing helical plates 102 on an extension 106 are the same diameter as the largest load bearing helical plate 102 on the lead 101.

Referring again to FIGS. 2-4, the shaft of the lead 101 can be hollow or solid, and the shaft of the extensions 106 are hollow such that the hollow portion of the extensions 106 and the lead 101, if hollow, form an internal cavity 120. When the helical pile 100 is assembled, as described above, the cavity 120 is contiguous through the hollow portions of the lead 101, if hollow, and extensions 106. If the lead 101 is hollow, the lead end portion 104 is sealed at the tip such that fluid flowing through the cavity 120 does not exit the helical pile 100. If the lead 101 is solid, a plug 122, seen in FIG. 3, is included at the coupling junction or joint 109 between the lead head portion 103 and the extension end portion 105 of the line extension 106 connected to the lead 101. The plug 122 is used to seal the cavity 120 so that fluid flowing through the cavity 120 does not exit from the helical pile 100. In the exemplary embodiment shown in FIGS. 2 and 3, the lead 101 is solid and the plug 122 seals the extension end portion 105, i.e., the plug seals the cavity 120 at the extension end portion 105. It is noted that the shaft of the terminating extension 108 is also hollow, as seen in FIG. 4, but does not form part of the cavity 120.

Figure 5:
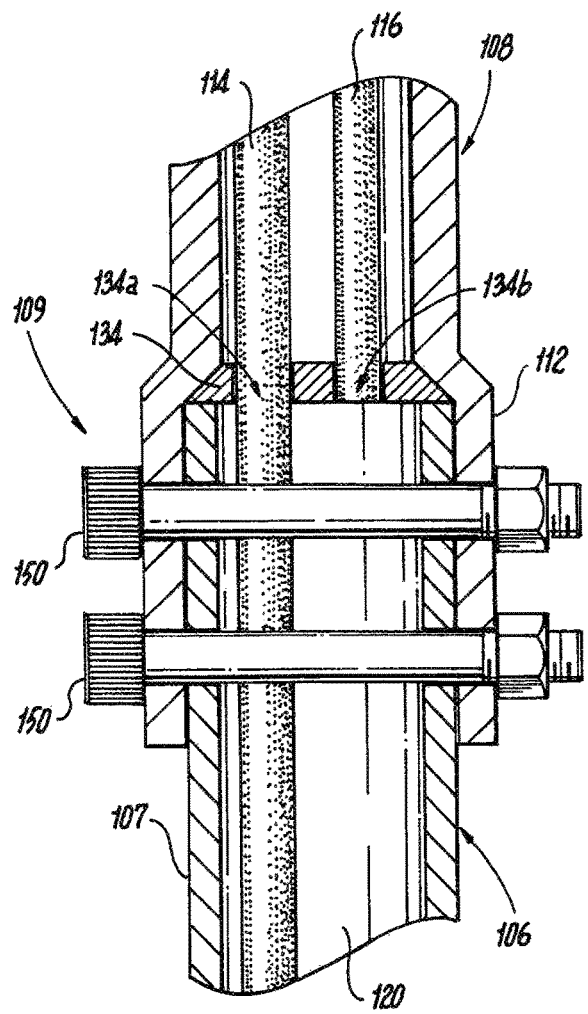
FIG. 5 is a cross-sectional view similar to FIG. 4 of another exemplary embodiment of a coupling joint between an end portion of the terminating extension and a head portion of the extension.
Figure 6:
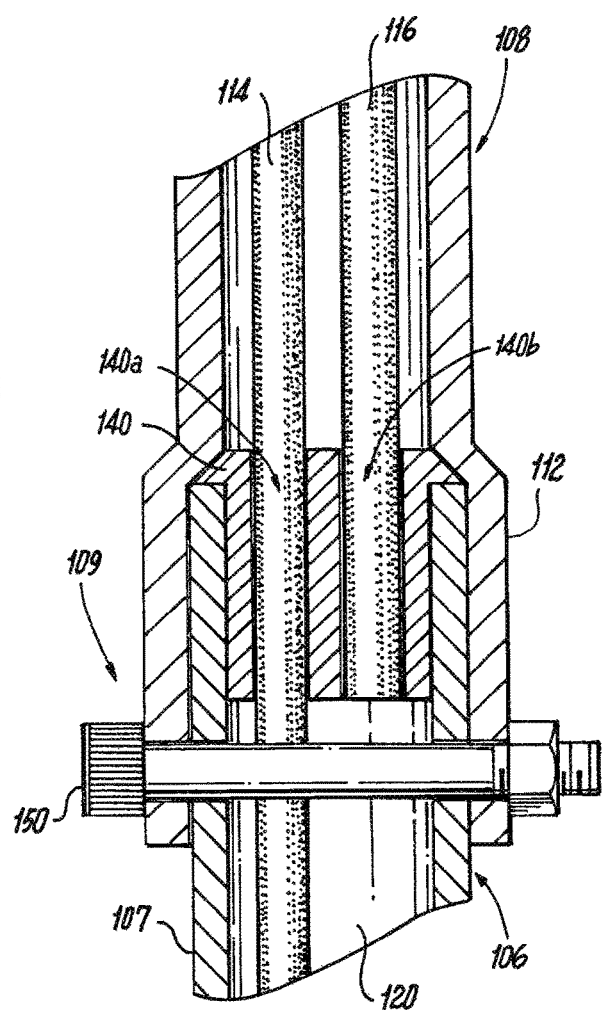
FIG. 6 is a cross-sectional view similar to FIG. 4 of another exemplary embodiment of a coupling joint between an end portion of the terminating extension and a head portion of the extension.
Figure 7:
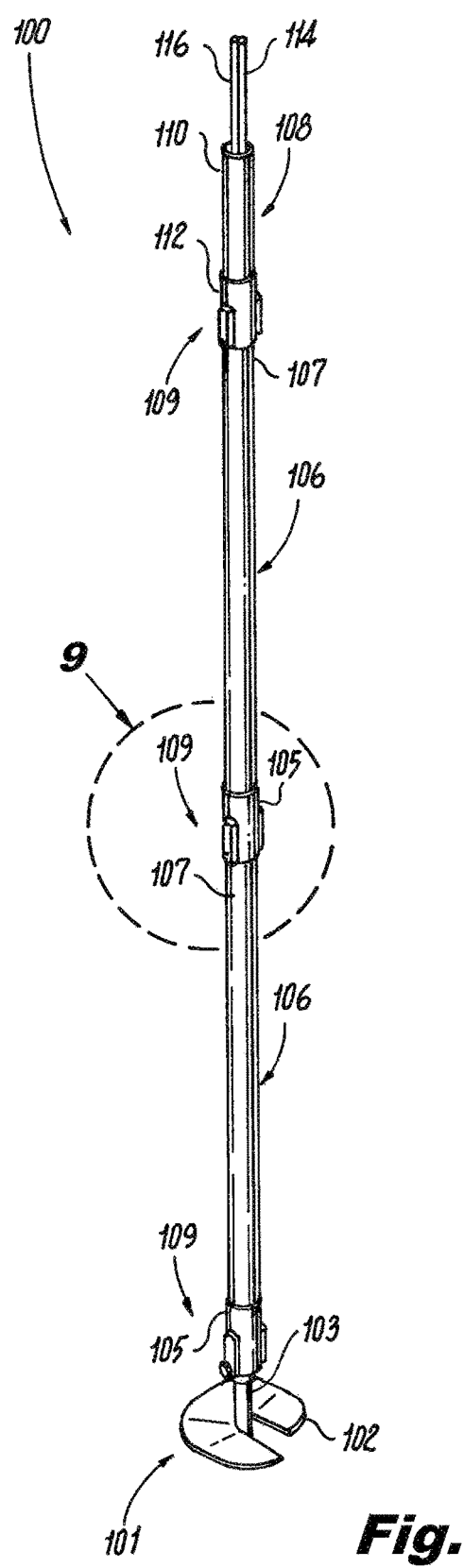
FIG. 7 is a top perspective view of another exemplary embodiment of a helical pile according to the present disclosure, illustrating a lead and a series of extensions attached to the lead.
Figure 8:
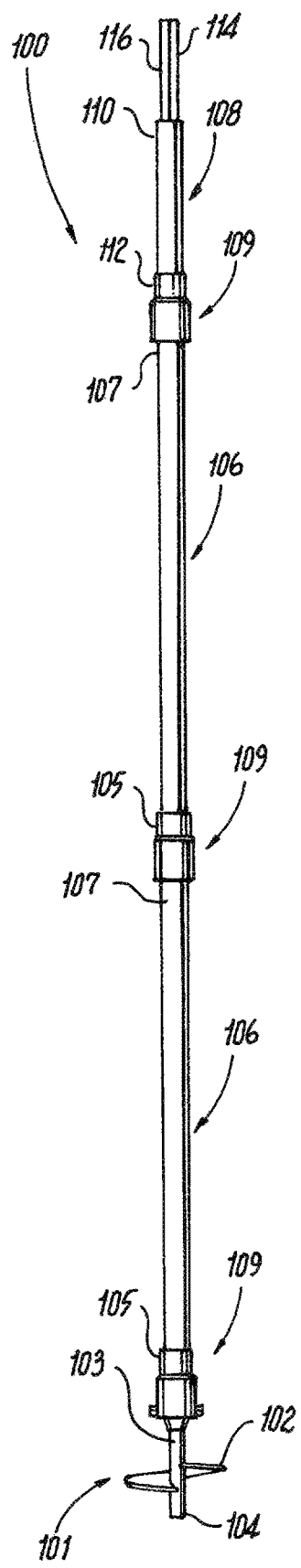
FIG. 8 is a side elevation view of the helical pile of FIG. 7.
Figure 9:
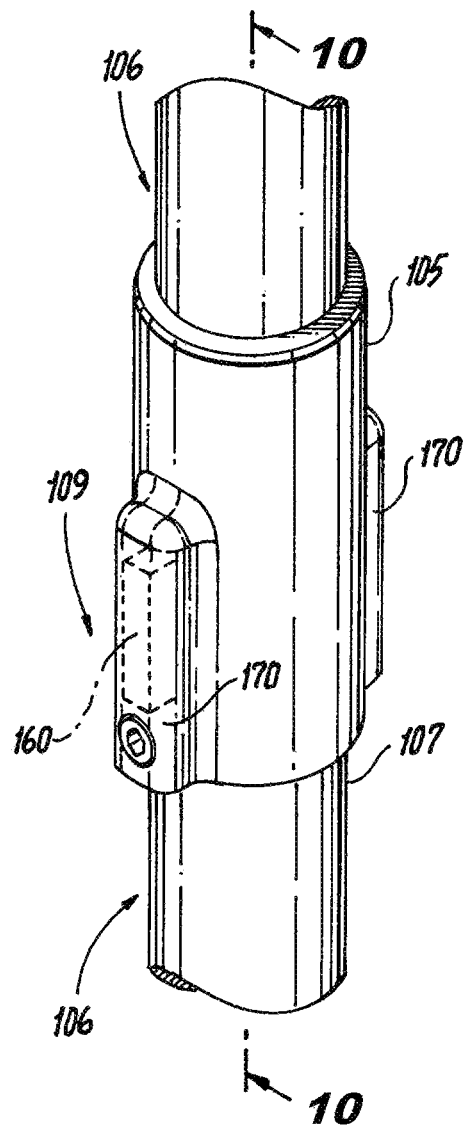
FIG. 9 is an enlarged perspective view of a coupling joint of the helical pile of FIG. 7 taken from detail 9.
Figure 10:
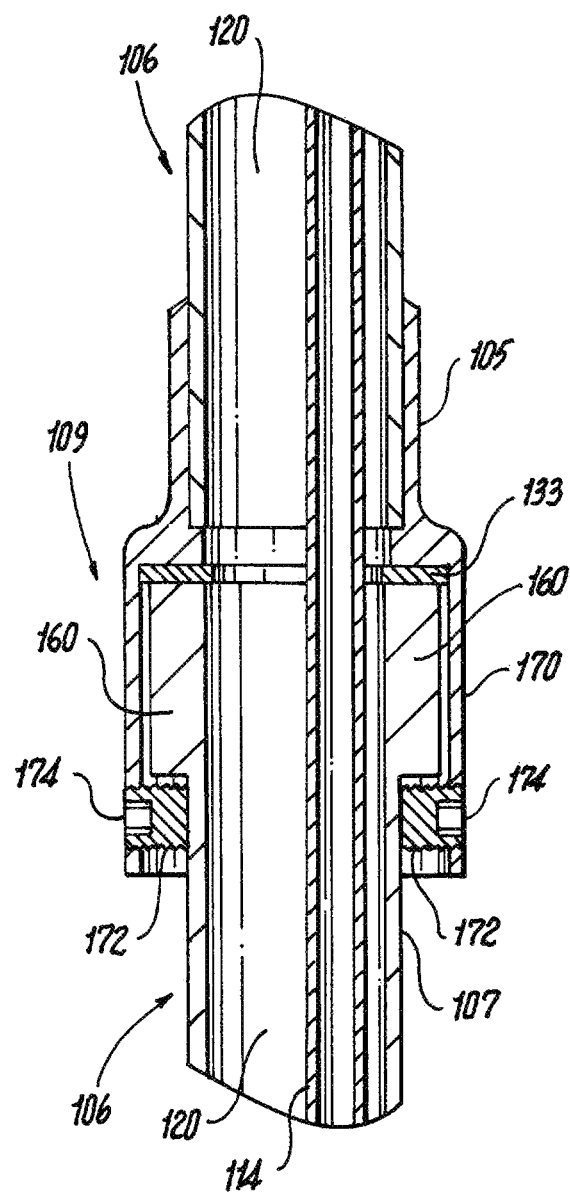
FIG. 10 is a cross-sectional view of the coupling joint of FIG. 9 taken along line 10-10.

The lead head portion 103 can be secured to an extension end portion 107 or the terminating extension end portion 112 using a number of fastening configurations. For example, the lead head portion 103 can be secured to an extension end portion 107 or the terminating extension end portion 112 using a nut and bolt, as seen in FIGS. 5 and 6, and preferably galvanized nuts and bolts. In another exemplary embodiment, the lead head portion 103 can be secured to an extension end portion 107 or the terminating extension end portion 112 using a threaded fastening configuration where the lead head portion 103 is threaded and the extension end portion 107 or the terminating extension end portion 112 is threaded to receive the threaded lead head portion. In another exemplary embodiment, the lead head portion 103 can be welded to an extension end portion 107 or the terminating extension end portion 112. In another exemplary embodiment, the lead head portion 103 can be secured to an extension end portion 107 or the terminating extension end portion 112 using adhesives. In another exemplary embodiment, the lead head portion 103 can be secured to an extension end portion 107 or the terminating extension end portion 112 by a friction fit.

Turning now to FIGS. 4-6, the coupling joint 109 between the terminating extension 108 and the next in line extension 106 will be described. The terminating extension end portion 112 fits over the extension head portion 107 of the upper most line extension 106 (or the lead head portion 103 of the lead 101 if no extension sections are used) when the helical pile 100 is installed in the soil 201. One or more seal members 132 extend around the inner surface of the terminating extension end portion 112 and engage with an outer surface of the extension head portion 107, as seen in FIG. 4, to form a liquid-tight seal. The one or more seal members 132 may be elastomeric O-rings or compressible HDPE. In the exemplary embodiment of FIG. 4, the terminating extension 108 may be affixed to the extension head portion 107 of the upper most line extension 106 or the lead head portion 103 by a friction fit, and a plate 134 is positioned over the cavity 120 as shown to seal the cavity 120 at the upper most line extension 106. The plate 134 may be made of a metallic material, a non-metallic material or a combination thereof. When the terminating extension 108 is secured to the extension head portion 107 of the upper most line extension 106 or the lead head portion 103 of the lead 101, the plate 134 forms a liquid-tight seal across the top of cavity 120. It is noted that the connection points between lead 101, extensions 106 and the terminating extension 108 described herein are also referred to as the coupling joint 109 in the singular or coupling joints in the plural.

As indicated above, tubes 114 and 116 extend from the helical pile 100 and connect to the exchanger system 200. More specifically, the inlet tube 114 extends through a first aperture 134a in the plate 134 and into the cavity 120, and the outlet tube 116 connects with a second aperture 134b in the plate 134 so that the outlet tube 116 is in fluid communication with the cavity 120. The terms "inlet tube" and "outlet tube" are used for illustration. Either of tubes 114 and 116 can be an inlet or an outlet for the fluid, as discussed below.

In another exemplary embodiment shown in FIG. 5, the terminating extension 108 may be affixed to the extension head portion 107 of the upper most line extension 106 (or the lead head portion 103) using one or more nuts and bolts 150, and a plate 134 is positioned over the cavity 120 as shown to seal the cavity 120 at the upper most line extension 106. The plate 134 may be made of a metallic material, a non-metallic material or a combination thereof. When the terminating extension 108 is secured to the extension head portion 107 of the upper most line extension 106 (or the lead head portion 103 of the lead 101), the plate 134 forms a liquid-tight seal across the top of cavity 120. In another exemplary embodiment shown in FIG. 6, the terminating extension 108 may be affixed to the extension head portion 107 of the upper most line extension 106 (or the lead head portion 103) using one or more nuts and bolts 150, and a plug 140 is inserted into the cavity 120 as shown to seal the cavity 120 at the upper most line extension 106. The plug 134 may be made of a metallic material, a non-metallic material or a combination thereof. When the terminating extension 108 is secured to the extension head portion 107 of the upper most line extension 106 (or the lead head portion 103 of the lead 101), the plug 140 forms a liquid-tight seal across the top of cavity 120. In this exemplary embodiment, the inlet tube 114 extends through a first aperture 140a in the plug 140 and into the cavity 120, and the outlet tube 116 connects with a second aperture 140b in the plug 140 so that the outlet tube 116 is in fluid communication with the cavity 120.

Referring now to FIGS. 7-10, another exemplary embodiment of a helical pile 100 according to the present disclosure is shown. In this exemplary embodiment, the helical pile 100 is substantially the same as the helical pile 100 described above except the coupling joints 109 differ. In this exemplary embodiment, the coupling joint 109 between two extensions is shown and described. In this exemplary embodiment, the coupling joint 109 between the extension end portion 105 of one line extension 106 and the head portion 107 of another line extension 106 includes a flange 160, a spline 170 and a sealing member 133, such as a gasket, used to seal the coupling joint 109 so that fluid does not escape the cavity 120 in the area of the coupling joint 109. In one exemplary embodiment, the head portion 107 of the line extension 106 includes one or more elongated flanges 160 configured to fit within a corresponding spline 170 in the extension end portion 105 of the adjacent line extension 106. The one or more flanges 160 are spaced apart around the periphery of the head portion 107 of the line extension 106. The spline 170 includes an aperture 172 configured to receive a set screw 174. When the line extensions 106 are joined, a spline 170 slides over a flange 160 until the apertures 172 are beyond the flange 160, and the set screws 174 are tightened against the head portion 107 of one line extension 106 to secure the line extensions 106 together. The spline 170 and the set screws 174 prevent the removal of the flange 160 until the set screws 174 are loosened to a point where the flange 160 can slide past the set screws 174. In another exemplary embodiment, the flange 160 extends around the periphery of the head portion 107 of the line extension 106, and the spline 170 extends around the periphery of the extension end portion 105 of the adjacent line extension 106 and is configured to fit over the flange 160. The spline 170 includes one or more apertures 172 each configured to receive a set screw 174. When the line extensions 106 are joined, the spline 170 slides over the flange 160 until the apertures 172 are beyond the flange, and the set screws 174 are tightened against the head portion 107 of one line extension to secure the line extensions together. The spline 170 and the set screws 174 prevent the removal of the flange 160 until the set screws 174 are loosened to a point where the flange can slide past the set screws 174.

Figure 12:
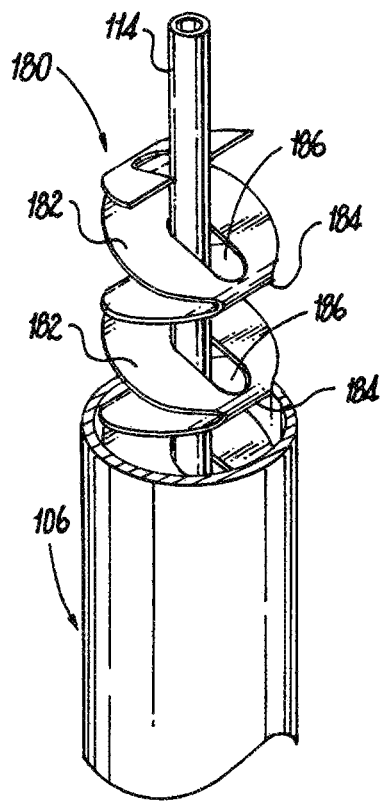
FIG. 12 is a perspective view of an exemplary embodiment of a baffle inserted into a cavity within the helical pile according to the present disclosure.
Figure 13:
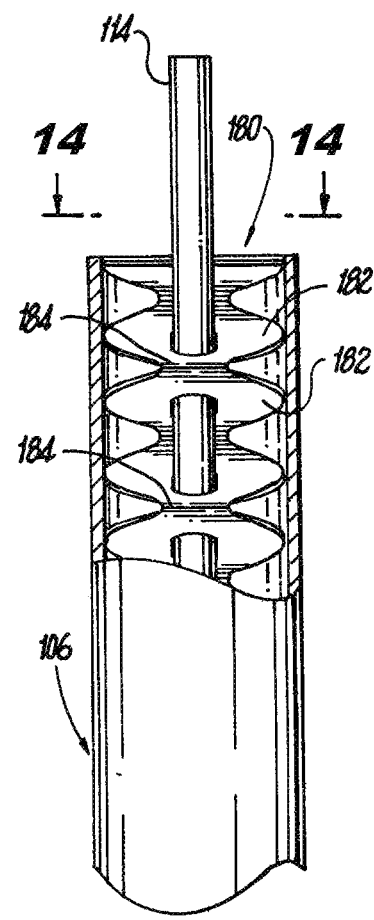
FIG. 13 is a side elevation view of the baffle inserted into the cavity within the helical pile of FIG. 12.
Figure 14:
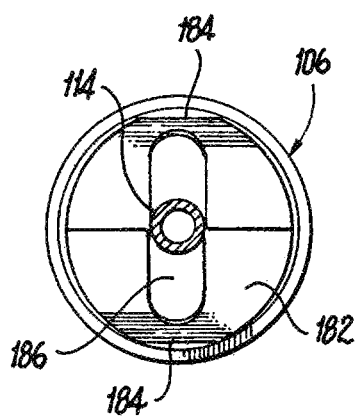
FIG. 14 is a top plan view of the baffle inserted into the cavity within the helical pile of FIG. 12.

Referring to FIGS. 12-14, in another exemplary embodiment of the helical pile 100 according to the present disclosure, baffles or fins may be included within the cavity 120 of the helical pile 100. The baffle or fins 180 may be positioned within the cavity 120 of the lead 101, if hollow, and/or each line extension 106. The baffle or fins 180 may extend along the length of the lead 101, if hollow, and each line extension 106, or the baffle or fins may extend along a portion of lead 101, if hollow, and/or each line extension 106. Thus, the baffles or fins 180 may be continuous or segmented within the cavity 120. The baffles or fins 180 are in contact with the interior wall of the cavity 120 so that thermal energy can be exchanged between the cavity 120 wall and the baffles or fins. The baffles, fins 180 or other similar structures increase the surface area of material that can exchange heat with the fluid flowing through the cavity 120. Increasing the surface area of material that can exchange heat with the fluid increases the exchange of heat between the fluid and the helical pile 100 allowing the fluid to absorb or dissipate thermal energy at a quicker rate. In the case of baffles 180, the baffles 180 interrupt the flow of fluid through the cavity 120 to induce or enhance turbulent flow of the fluid, facilitating the transfer of heat to or from the fluid. An exemplary embodiment of a baffle 180 segment is shown in FIGS. 12-14. The baffle 180 has a series of plates 182 joined in an accordion like fashion at joints 184. Preferably, the joints 184 are in thermal communication with the inner wall of the cavity 120. The baffle 180 may be a unitary structure or the baffle 180 may be individual plates secured together by for example welds. A central portion of each plate 182 includes a slot 186, which are aligned so that the inlet tube 114 and/or outlet tube 116 can pass through the baffle 180.

If fins 180 are the structure used to increase the surface area of material that can exchange heat with the fluid, the fins 180 may be attached to the inner wall of the cavity 120 and extend toward the center of the cavity 120. If the fins 180 extend along the entire length of the cavity 120, the portion of the helical pile 100 encompassing the cavity 120 would have a constant cross-sectional shape along its length that allows the section to be produced by extrusion. Other configurations of structures that can be used to increase the surface area of material that can exchange heat with the fluid, include star shape structures and polygon structures. In other embodiments, baffles 180 may be provided inside the cavity 120 in combination with fins 180 or other structures used to increase the surface area of material that can exchange heat with the fluid.

Referring to FIGS. 15-17, an exemplary embodiment of a helical pile 100 according to the present disclosure being driven in the ground 201 is shown. FIG. 15 shows a lead section 101 attached to line extension 106 being driven into the ground 201 using a pile drive system 300. According to one exemplary embodiment, a head 302 of the pile drive system 300 is connected to the extension head portion 107 of the line extension 106, which rotates the lead 101 and the extension 106. Rotating the lead 101 and the line extension 106 causes the helical plates 102 to screw into the ground 201. The coupling joint 109 between the lead 101 and the first line extension 106 is such that torque applied to the extension head portion 107 of the first line extension 106 rotates the helical plates 102, moving the helical pile 100 deeper into the ground. When first line extension 106 reaches a sufficient depth, a second line extension 106 can be coupled to the first line extension 106, as shown in FIG. 16. The coupling joint 109 between the first line extension 106 and the second line extension 106 is such that torque applied to the extension head portion 107 of the second line extension 106 rotates the helical plates 102, moving the helical pile 100 deeper into the ground 201. As shown in FIG. 17, once the helical pile 100 has reached the desired depth. The inlet and outlet tubes 114 and 116, respectively, are then inserted into the cavity 120 of the helical pile 100. The length "L" of the inlet tube 114 below the plate 134 can be adjusted by cutting an excess portion of the inlet tube 114 so that L is less than the distance D from the extension head portion 107 of the last line extension 106 to the plug 122 in the lead 101, seen in FIG. 3, which in this exemplary embodiment is near the bottom of the cavity 120. With the inlet and outlet tubes 114 and 116 inserted into the cavity 120, the terminating extension 108 may be secured to the last line extension 106, here the second line extension 106, as described above.

Figures 20, 21:
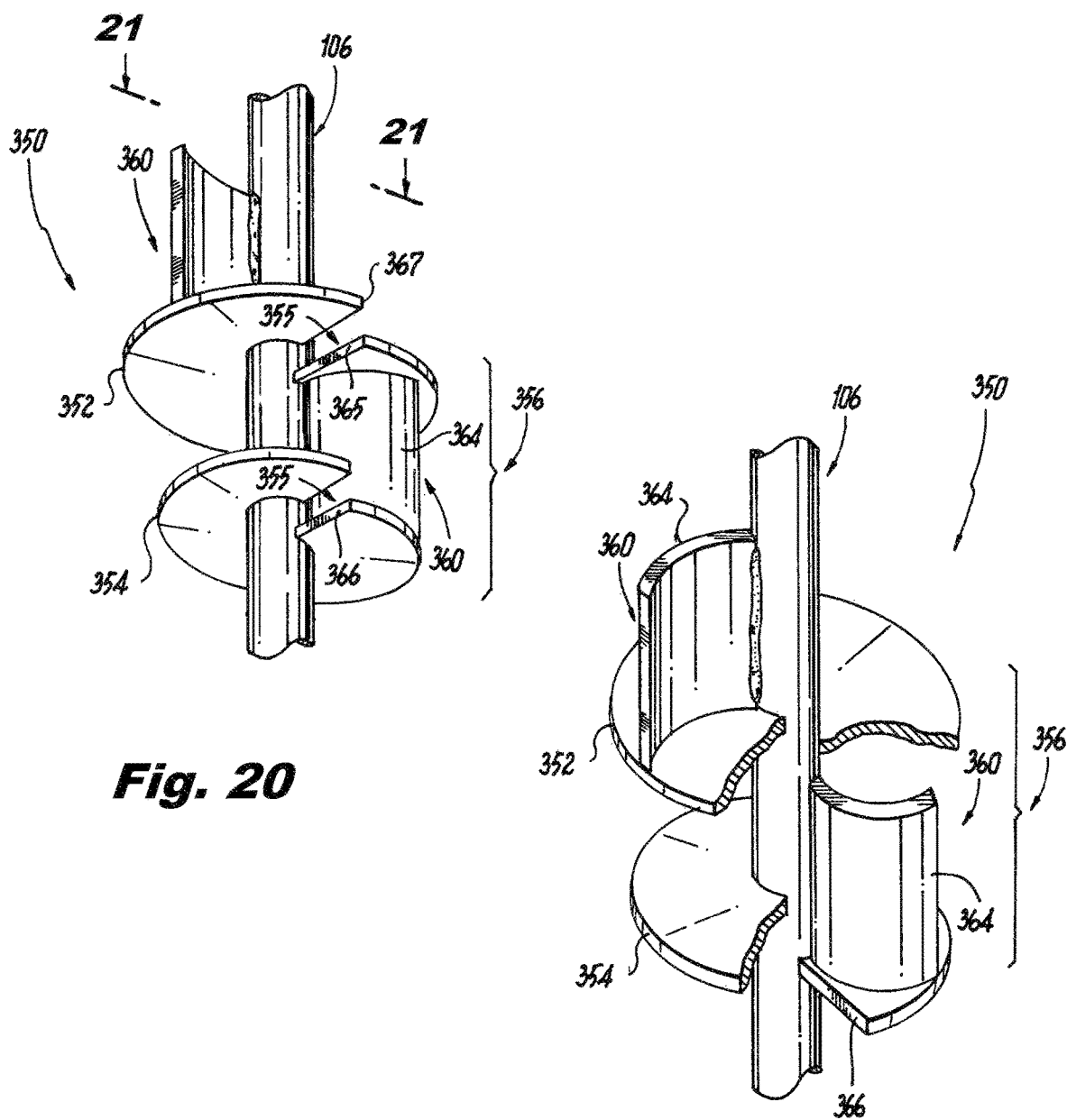
FIG. 20 is a bottom perspective view of an exemplary embodiment of a soil displacement assembly according to the present disclosure.
FIG. 21 is a top perspective view in partial cross-section of the soil displacement assembly of FIG. 20 taken along line 21-21.
Figure 22:
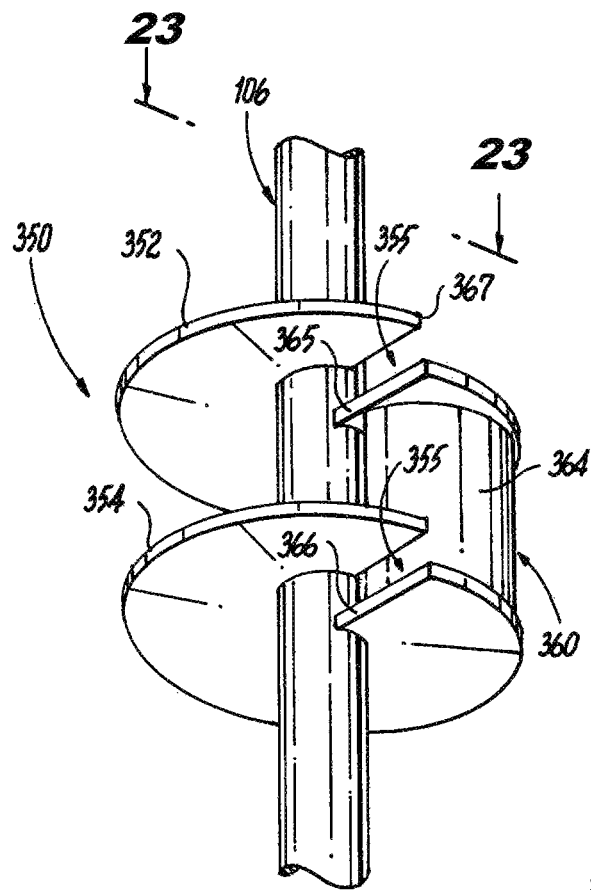
FIG. 22 is a bottom perspective view of another exemplary embodiment of a soil displacement assembly according to the present disclosure.
Figure 23:
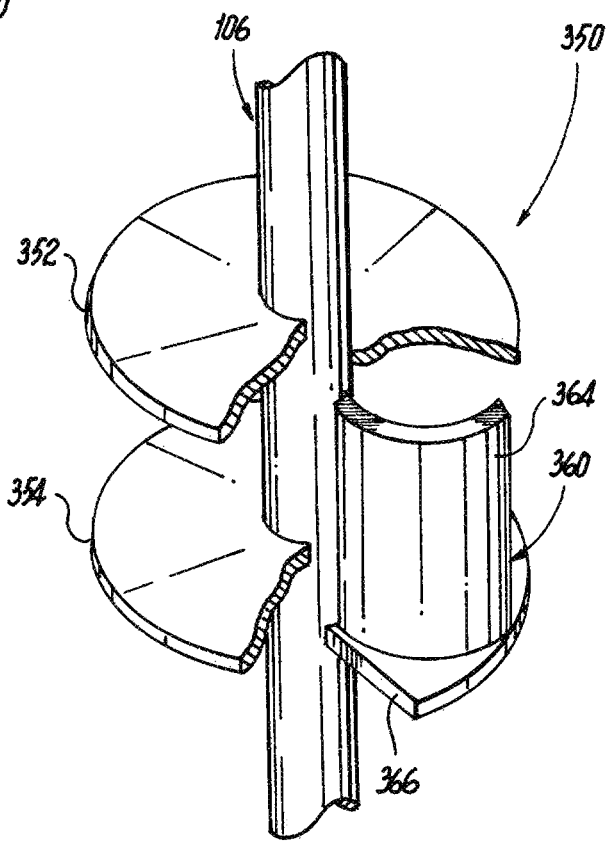
FIG. 23 is a top perspective view in partial cross-section of the soil displacement assembly of FIG. 22 taken along line 23-23.

Referring now to FIGS. 18-21, another exemplary embodiment of the helical pile 100 according to the present disclosure is shown. In this exemplary embodiment, the helical pile 100 is substantially the same as the helical pile 100 described above except that the helical plate 102 is replaced with a soil displacement assembly 350 and a terminating extension is not used. In this exemplary embodiment, the soil displacement assembly 350 according to the present disclosure includes two helical plates 352 and 354 forming a pair 356, and a pair of soil displacement plates 360. The helical soil plate pair 356 comprises an upper helical plate 352 and a lower helical plate 354 which are similar to the helical plate 102 described above. The two helical plates 352 and 354 forming the pair 356 may have different diameters as seen in FIGS. 20 and 21 or they may have the same diameter as seen in FIGS. 22 and 23. In the exemplary embodiment of FIGS. 18-21, the upper helical plate 352 has a larger diameter than the lower helical plate 354.

In the exemplary embodiment of FIGS. 18-21, the first soil displacement plate 360 is positioned between the upper and lower helical plates 352 and 354, and secured to the shaft of the line extension 106 (or the shaft of the lead 101) by, for example, welding or mechanical fasteners. The first soil displacement plate 360 is also attached to each of the upper and lower helical plates 352 and 354 by, for example, welding or mechanical fasteners. Attaching the first soil displacement plate 360 between the upper and lower helical plates 352 and 354 increases the strength of the first soil displacement plate 360 facilitating displacement of the soil as described herein. The second soil displacement plate 360 is positioned on the upper helical plate 352 and secured to the shaft of the line extension 106 (or the shaft of the lead 101) by, for example, welding or mechanical fasteners. The second soil displacement plate 360 is also attached to the upper helical plate 352 by, for example, welding or mechanical fasteners. Attaching the second soil displacement plate 360 to the upper helical plate 352 increases the strength of the soil displacement plate 360.

Each soil displacement plate 360 has a soil contacting surface 364, and extends radially from the shaft of the line extension 106 (or the lead 101) to an outer edge of each helical plate. Preferably, each soil displacement plate 360 is a curved plate, as shown in FIG. 21, and is secured to the helical plates 352 and/or 354 so that the soil displacement plate 360 curves in a counterclockwise direction proceeding radially from the shaft of the extension 106 (or the lead 101) such that the soil contacting surface 364, here the convex surface, of the soil displacement plate 360 is positioned to contact and displace the soil to create the cavity 370 for forming a grout column 380, seen in FIG. 25. More specifically, as the helical plates 352 and 354 rotate clockwise, the convex surface 364 of the soil displacement plate 360 contacts the soil and displaces it radially outward away from the shaft of the extension 106 (or the lead 101) creating the displaced soil cavity 370.

The soil displacement plate 360 may be secured to the lead shaft or line extension shaft and the helical plates 352 and 354 may be secured anywhere along the length of lead shaft. In the configuration shown in FIGS. 20 and 21, one end of the first soil displacement plate 360 is positioned adjacent a leading edge 365 of the upper helical plate 352 and adjacent a leading edge 366 of the lower helical plate 354. The second soil displacement plate 360 is attached to the upper helical plate 352 and the shaft of the line extension 106 (or the shaft of the lead 101) near the trailing edge 367 of the upper helical plate 352. The second soil displacement plate 360 provides additional soil displacement further facilitating the formation of the cavity 370 in which the grout column 380, seen in FIG. 24, is formed.

The first soil displacement plate 360 is illustrated in FIGS. 20 and 21 as having a soil contacting surface 364 over a relatively small circumferential portion of the upper and lower helical plates 352 and 354. However, the soil displacement plate 360 may have a soil contacting surface 364 that extends along a more substantial portion of the circumference of the upper and lower helical plates 352 and 354. More specifically, if the soil displacement plate 360 has a curvature, the radius of the curvature of the soil displacement plate 360 may vary depending upon, for example, the type of soil to be encountered and the relative density of the soil to be encountered. The radius of the curvature of the soil displacement plate 360 may be in the range of about 30 degrees to about 180 degrees. In an alternative configuration, the soil contacting surface 364 may vary and may be irregular so long as the soil contacting surface 364 is capable of displacing soil outwardly as the helical pile 100 is being rotated.

The vertical orientation of the soil displacement plates 360 may vary depending upon a number of considerations such as the location along the helical plates 352 and 354 and the radius of curvature. For example, in the configuration shown in FIGS. 21 and 22, the soil displacement plates 360 are secured to the helical plates 352 and/or 354 so that the soil displacement plate 360 is substantially vertical relative to the shaft of the line extension 106 (or the shaft of the lead 101). As another example, the soil displacement plate 360 may be angled or tilted relative to the shaft of the line extension 106 (or the shaft of the lead 101). A more detailed description of the soil displacement assemblies or plates can be found in commonly owned application Ser. No. 15/346, 672 filed on Nov. 8, 2016, 62/470,114 filed on Mar. 10, 2017 and 62/468,877 filed on Mar. 8, 2017 which are each incorporated herein in their entirety by reference. In addition, other soil displacement devices may be used to create the displaced soil cavity 370. For example, the soil displacement device described in commonly owned U.S. Pat. No. 9,416,513, which is incorporated herein in its entirety by reference.

Referring to FIGS. 22 and 23, another exemplary embodiment of the soil displacement assembly 350 is shown. In this exemplary embodiment, at least one soil displacement plate 360 positioned between the upper and lower helical plates 352 and 354, as described above. Additional soil displacement plates 360 may be between the upper and lower helical plates 352 and 354.

Referring now to FIGS. 24 and 25 and using the soil displacement assembly of FIGS. 20 and 21, an example of the insertion of a lead 101 into the ground and the pouring of filler into the cavity 370 created by the soil displacement assembly 350 of the present disclosure will be described. Initially, as the shaft of the lead 101 is rotated in a clockwise direction the leading edge 366 and outer edge of the lower helical plate 354 grips the soil to start pulling the lead 101 into the ground 201. As the lead 101 rotates the soil contacting surface 364 of the soil displacement plate or plates 360 displaces the soil cut by the leading edge 366 and outer edge of the lower helical plate 354 radially outwardly away from a shaft of the lead 101 to begin to form a cavity 370 in which filler is poured. The leading edge 365 and outer edge of the upper helical plate 352 then grips the soil to assist in pulling the lead 101 into the ground 201. A gap 355 in the helical plates 352 and 354 permits the filler being poured into the cavity to fill a void 357 between the upper and lower helical plates 352 and 354 and permits the filler to pass through the soil displacement assembly 350 to provide a uniform pour of the filler, as seen in FIG. 25.

When a second soil displacement assembly 350 secured to a line extension 106 enters the cavity 370, the leading edge 366 and outer edge of the lower helical plate 354 grips the soil to assist in pulling the line extension 106 into the ground 201. As the line extension 106 rotates the soil contacting surface 364 of the soil displacement plate or plates 360 displaces any soil cut by the leading edge 366 of the lower helical plate 354 radially outwardly away from a shaft of the line extension 106 to continue to form the cavity 370 in which filler is continued to be poured. The leading edge 365 and outer edge of the upper helical plate 352 then grips the soil to assist in pulling the line extension 106 into the ground 201. Again, the gap 355 in the helical plates 352 and 354 permits the filler being poured into the cavity 370 to fill the void 357 between the upper and lower helical plates 352 and 354 of the second soil displacement assembly 350, and to permit the filler pass through the soil displacement assembly 350 to provide a uniform pour of the filler.

When a third soil displacement assembly 350 secured to a line extension 106 enters the cavity 370, the leading edge 366 and outer edge of the lower helical plate 354 grips the soil to assist in pulling the line extension 106 into the ground 201. As the line extension 106 rotates the soil contacting surface 364 of the soil displacement plate or plates 360 displaces any soil cut by the leading edge 366 of the lower helical plate 354 radially outwardly away from a shaft of the line extension 106 to continue to form the cavity 370 in which filler is continued to be poured. The leading edge 365 and outer edge of the upper helical plate 352 then grips the soil to assist in pulling the line extension 106 into the ground 201. Again, the gap 355 in the helical plates 352 and 354 permits the filler being poured into the cavity to fill the void 357 between the upper and lower helical plates 352 and 354 of the second soil displacement assembly 350, and to permit the filler pass through the soil displacement assembly to provide a uniform pour of the filler.

As noted in the embodiment of FIGS. 24 and 25, the soil displacement assembly 350 can have an upper helical plate 352 with a larger diameter than the lower helical plate 354 so that a portion of the upper helical plate 352 is not encased within the grout column 380 as seen in FIG. 25. By having a portion of the upper helical plates for each soil displacement assembly 350 driven into the soil extend beyond the outer periphery of the grout column 380, the portion of the upper helical plates 352 engaged with the soil can also minimize grout column 380 jacking describing in more detail below.

In the embodiments of FIGS. 18-25, the line extension head portion 107 (or the head portion of the lead 101) end adjacent to grade such that a foundation 376 for supporting a structure can be formed as seen in FIG. 25. In such an embodiment, the inlet and outlet tubes 114 and 116 extend from the upper surface of the foundation 376 for subsequent connection to the exchanging system 200 as described above.

The helical piles 100 with one or more soil displacement assemblies 350 of the present disclosure provide ways of displacing soil for the purpose of creating a grout column 380 with an embedded soil displacement pile. The one or more helical soil displacement assemblies 350 displace soil so that filler may be poured into a cavity 370 created by the one or more soil displacement assemblies 350 around the soil displacement pile forming a grout column 380 at the job site. The soil displacement assemblies 350 of the present disclosure permit the use of larger diameter shafts and helical plates 352 and 354 for the lead 101 and/or extensions 106 which facilitates displacement of more soil and results in the formation of grout columns 380 having larger diameters and therefore increased surface area for the thermal transfer and improved load capacity. The helical piles 100 with one or more soil displacement assemblies 350 of the present disclosure can be adapted to form any size grout column 380 needed for a particular job. For example, the helical pile 100 and one or more soil displacement assemblies 350 of the present disclosure can easily form grout columns 380 that are greater than eight inches in diameter.

Figure 26:
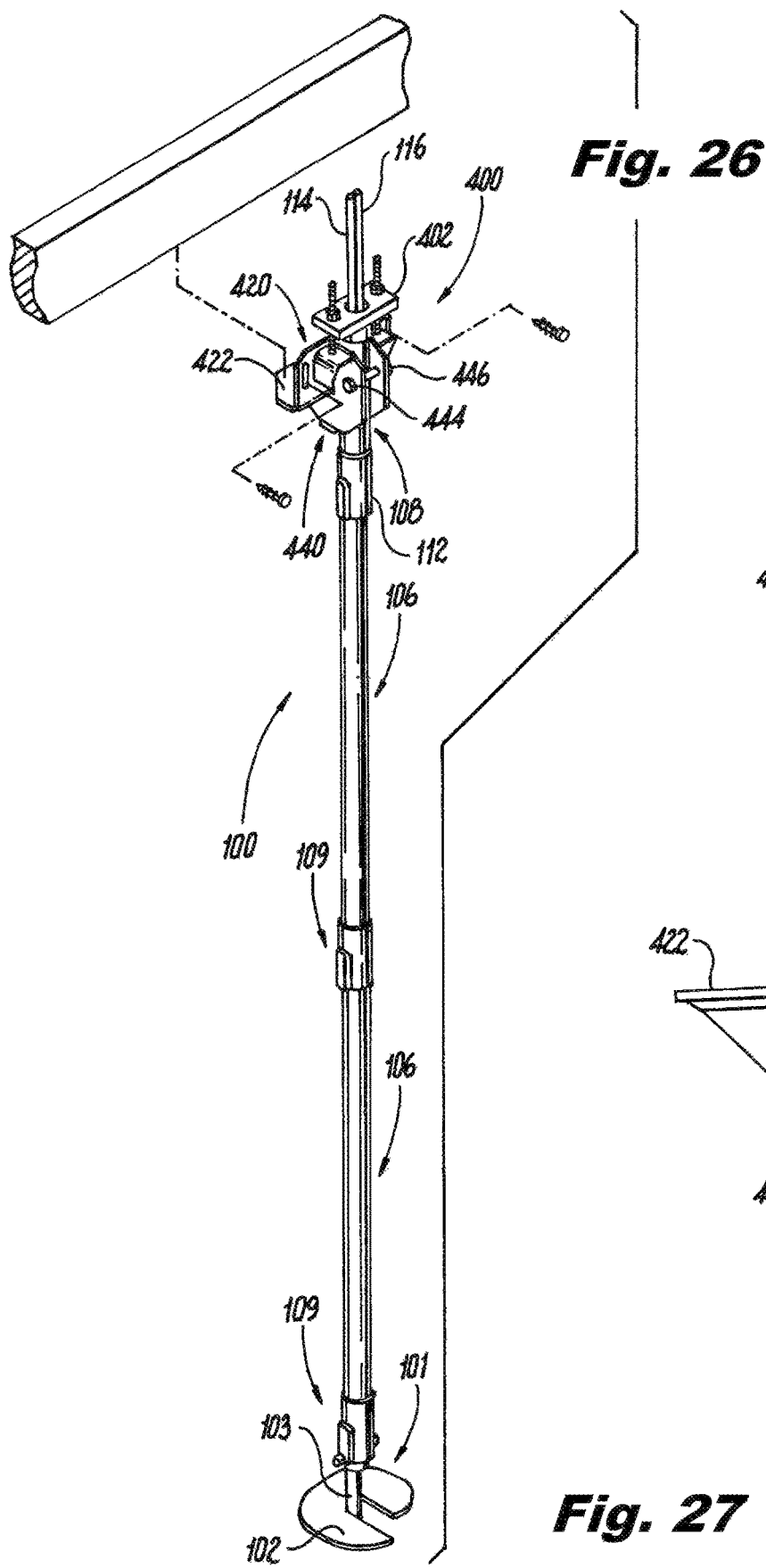
FIG. 26 is a top perspective view of another exemplary embodiment of a helical pile according to the present disclosure, illustrating a series of extensions secured to a lead and an exemplary embodiment of a mounting bracket according to the present disclosure attached to the terminating extension.
Figure 27:
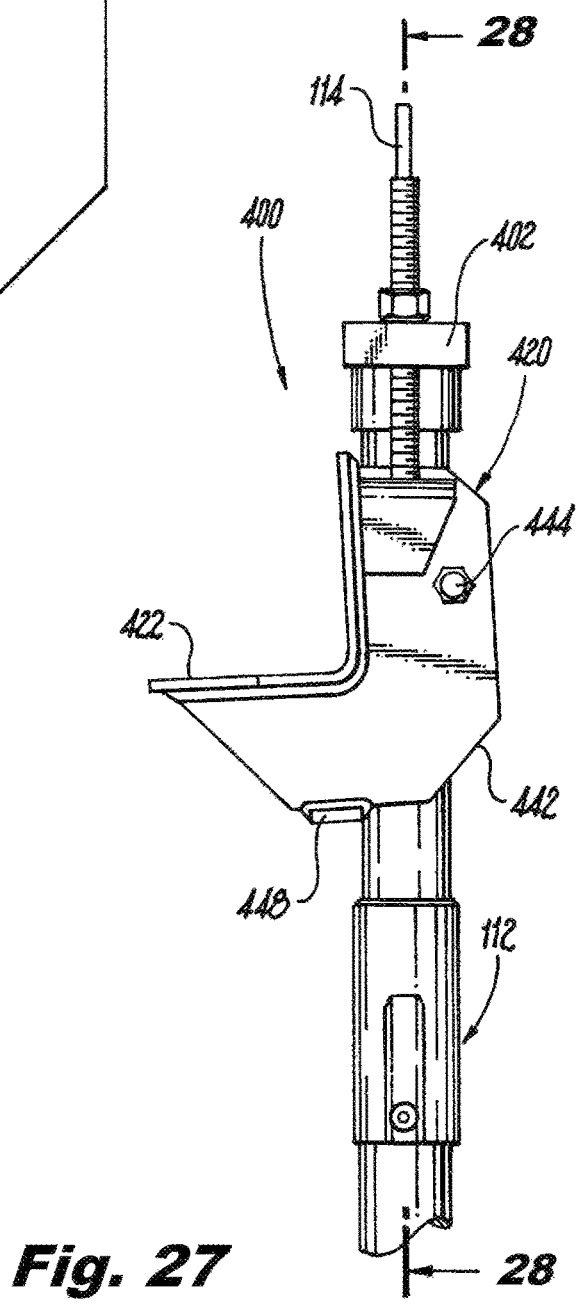
FIG. 27 is a side elevation view of a portion of the helical pile and of the mounting bracket of FIG. 26.
Figure 28:
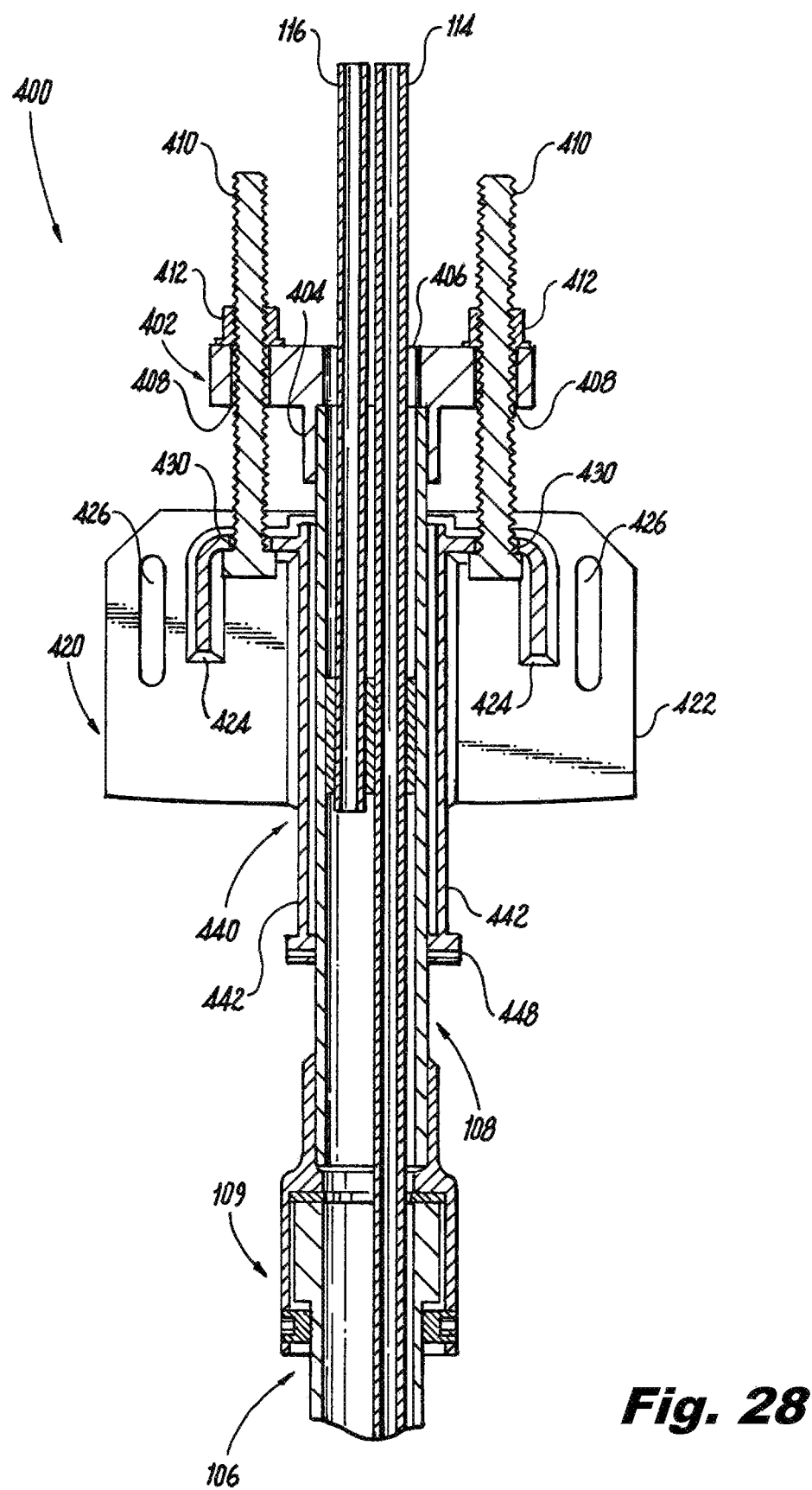
FIG. 28 is an enlarged cross-sectional view of the helical pile and mounting bracket of FIG. 26 taken along line 28-28.

Referring now to FIGS. 26-28, an exemplary embodiment of a mounting bracket assembly for attaching a structure to the helical pile 100 according to the present disclosure is shown. In this exemplary embodiment the helical pile 100 is substantially the same as the helical pile 100 of FIG. 2 described above and for ease of description is not repeated. The mounting bracket assembly 400 includes a pile adapter 402, a bracket assembly 420, and a bracket stabilizing assembly 440. The pile adapter 402 has a pile receiving flange 404 that is configured to fit over the terminating extension head portion 110. The pile adapter 402 has a central aperture 406 that is aligned with the pile receiving flange 404 so that the inlet and outlet tubes 114 and 116 can pass through the pile adapter 402. The pile adapter 402 may also include fastener apertures 408 that permit fasteners 410, e.g., threaded bolts, to pass through the pile adapter 402.

The bracket assembly 420 includes a mounting bracket 422 and mounting plates 424. The mounting bracket 422 is configured and dimensioned to support building structure components (not shown), such as joists, I-beams, concrete forms and the like. In the exemplary embodiment shown, the mounting bracket 422 is an L-shaped member. However, the mounting bracket 422 may have different shapes suitable to support the building structure components. The mounting bracket 422 may also include holes or slots 426 used for securing the building structure components to the mounting bracket 422 using fasteners, such as nut and bolt fasteners, lag bolts and the like. The mounting bracket plates 424 are secured to the mounting bracket 422 by for example welding the mounting bracket plates 424 to the mounting bracket 422. The mounting bracket plates 424 are used to secure the mounting bracket 422 to the pile adapter 402, by for example passing a bolt 410 through apertures 430 in the plates 428 and through the fastener apertures 408 in the pile adapter 402 and securing the bolts or fasteners 410 to the pile adapter with nuts 412. The bracket stabilizing assembly 440 includes a pair of bracket support arms 442 attached to the mounting bracket 422 by for example welded joints. The bracket support arms 442 are separated a distance sufficient to permit the shaft of the terminating extension 108 to fit between the bracket support arms 442, as shown in FIG. 28. A nut 444 and bolt 446, seen in FIG. 26, are used to fix the orientation of the bracket support arms 442 relative to the terminating extension 108. A portion of each bracket support arm 442 extends below the mounting bracket 422 and a stop member 448 secured to the bracket support arms 442 is also used to fix the orientation of the bracket support arms 442 relative to the terminating extension 108. When a building structure component is mounted to the mounting bracket 422, the load on the mounting bracket 442 applied by the building structure is transmitted to the pile adapter 402 via bolts 410 and nuts 412 which is then transmitted to the terminating extension 108 of the helical pile 100.

It is noted that because the terminating extension 108 can be selected independent of the other components of the helical pile 100, a particular configuration of the bracket assembly 420 can be selected at a job site during construction to fit the helical pile 100 to the particular configuration of building structure components encountered.

Referring now to FIGS. 29-30 another exemplary embodiment of the helical pile according to the present disclosure is shown. Like the helical piles described above, the helical pile 450 typically comprises square shafts or round shafts sequentially joined together. The shafts are typically hollow, but they may also be solid shafts. The lead 452 of the helical pile 450 has a lead head portion 454 and a lead end portion 456. The lead end portion 456 is configured to first penetrate the soil and terminates with a tapered or beveled edge at its distal end. The lead 452 typically has one or more spaced apart load bearing helical plates 458 arranged on the lead shaft typically in the lead end portion 456 to penetrate the soil. The load bearing helical plates 458 on the lead may have the same diameter or the load bearing helical plates 458 may have different diameters that are, for example, in a tapered arrangement. As an example, the tapered arrangement may be such that the smallest diameter load bearing helical plate 458 is closest to the tapered tip of the lead 452, and the largest load bearing helical plate 458 is at a distance away from the tapered tip. The load bearing helical plates 458 on the lead 452 are spaced apart at a distance sufficient to promote individual plate 458 load bearing capacity. Typically, the distance between the helical plates 458 is three times the diameter of the smallest load bearing helical plate 458 on the shaft of the lead 452. The diameter of the load bearing helical plates 458 in conventional helical piles 450 may range from between about 6 inches and about 16 inches depending upon the load the helical pile 450 is to carry. Positioned at the lead head portion 454 of the lead 452 is one or more soil displacement assemblies 350 used to create the displaced soil cavity 370, as described above.

As described above, the additional shafts attached to a lead, here lead 452, are known as extensions. In this exemplary embodiment, a terminating extension is not shown or used, but the present disclosure contemplates using a terminating extension as described above. Each extension 460 has an extension head portion 462 and an extension end portion 464. The lead head portion 454 connects to an extension end portion 464, or to a pile drive system head, which is used to rotate the lead and extensions, if used, to drive the helical pile 450 into the soil. The lead 452, extensions and terminating extension 460, if used, can be made of metal, e.g., steel or galvanized steel, or carbon fiber, or other suitable material known in the art.

Figure 31:
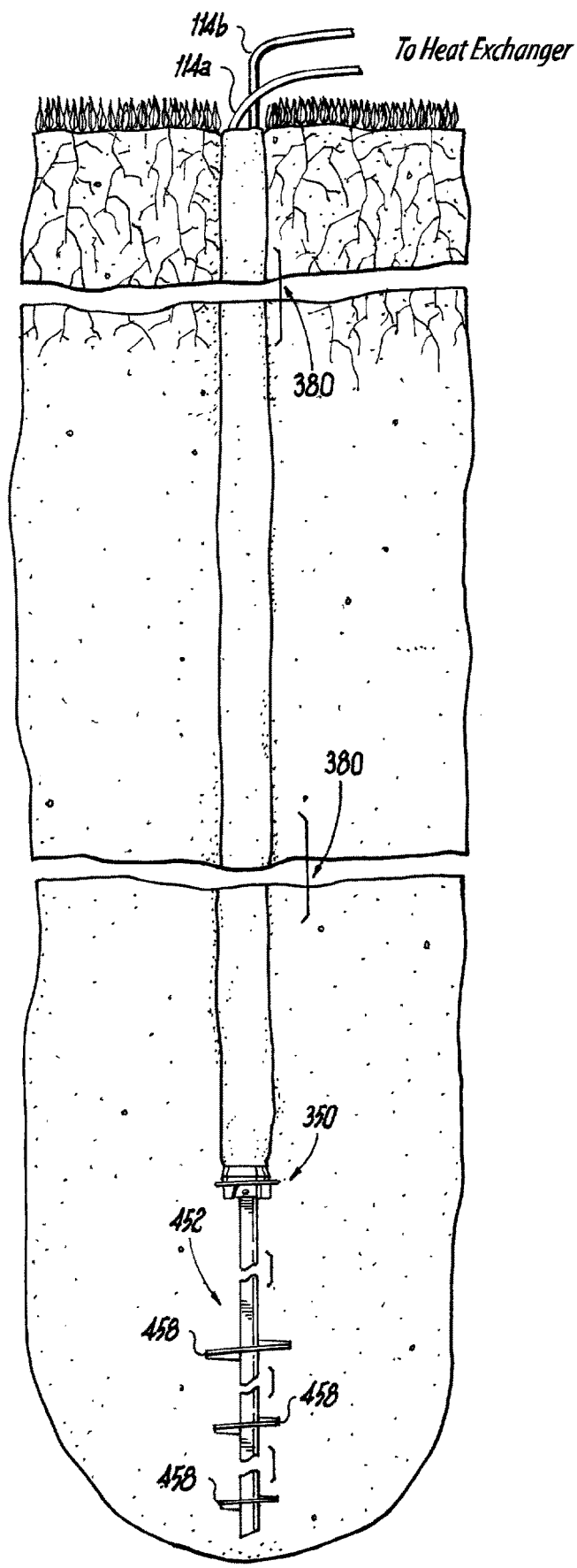
FIG. 31 is a side elevation view of the grout column of FIG. 30 with a portion of the grout removed to reveal tubing encased within the grout.

In the exemplary embodiment of FIGS. 29-31, the inlet and outlet conduits or tubes are formed from a single tube 114 that is wrapped around or coiled around the shaft of the extensions 460 of the helical pile 450 as shown. The tube 114 has an inlet end 114*a* and an outlet end 114*b* that connect to the exchanging system 200, shown in FIG. 1, in a similar manner as described above with tubes 114 and 116. Using a single tube 114 with inlet and outlet ends 114*a* and 114*b* allows the use of fluids without anti-corrosion properties, and minimizes potential corrosion of the helical pile 450 since the fluid would not flow into a cavity within the helical pile 450. In the exemplary embodiment shown, the tube 114 has a loop portion 114*c* that is fixed in position relative to the shaft of the extension 460 using a strap 466 attached to the extension 460. The strap 466 holds the tube loop portion 114*c* in position relative to the extension end portion 464 so that the tube does not pull up toward the surface of the ground when the helical pile 450 is driven into the soil. The tube 114 is preferably coiled around the shaft of the extensions 460 to provide a greater surface area to exchange heat between the soil, grout column 380 and the fluid flowing through the tube 114. The tube 114 may be made from a flexible material, such as a flexible polymer, an elastomer, a rubber, or the like, or the tube 114 may be made from a rigid or semi rigid material, such as a metal, a hard polymer, or the like.

To install the helical pile 450, the lead end portion 456 of the lead 452 is inserted in into the ground 201. As the shaft of the lead 452 is rotated in a clockwise direction, the helical plate 458 closest to the lead end portion 452 grips the soil to start pulling the lead 452 into the soil. As the lead 452 further penetrates the soil the second helical plate 458 grips the soil to assist pulling the lead 452 into the soil, and as the lead 452 further penetrates the soil the third helical plate 458 grips the soil to further assist pulling the lead 452 into the soil. As the lead 452 is driven further into the soil, the soil displacement assembly 350 engages the soil to begin to create the displaced soil cavity 370, as described above, and filler, e.g., grout, is poured into the cavity 370 to provide a uniform pour of the filler, as seen in FIG. 31. The grout surrounds the tube 114 to encase the tube 114 and the extensions 460 within the grout when hardened. The heat exchange in this exemplary embodiment is between the soil, the grout, the tube 114 and the fluid.

The present disclosure also contemplates that the mounting bracket assembly 400 described herein and used for attaching a structure to the helical pile may be used with the embodiment of the helical pile shown in FIGS. 29-31. In this exemplary embodiment, the mounting bracket assembly 400 includes a pile adapter 402, a bracket assembly 420, and a bracket stabilizing assembly 440. The bracket assembly 420 and bracket stabilizing assembly 440 are the same as described above and are not repeated. The pile adapter 402 is substantially the same as the pile adapter 402 described above, except that the pile adapter 402 would not include the central aperture 406.

It is noted that the grout columns 380 with a geothermal heat exchanger function may be exposed to temperature variations. These temperature variations may cause axial elongation and contraction of such grout columns as the temperature varies. The effects of the temperature variations, e.g., the above-noted axial elongation and contraction, on the behavior of the grout columns may also be referred to as "column jacking" or "column frost heave." More specifically, when the temperature of a grout column 380 is increased, the grout column 380 tends to elongate axially an amount proportional to the coefficient of thermal expansion of the helical pile 350 material and the grout, and the magnitude of temperature change. As the temperature of the grout column 380 decreases or cools, the grout column tends to contract axially but the grout column 380 may not return to its original position such that the grout column is displaced from its original position. Over time, as the temperature of the grout column increases and decreases, the axial elongation and contraction of the grout column 380 may slowly cause the grout column 380 to displace further away from its original position.

To help minimize column jacking, the lead 452 of the helical pile 450 is not encased within the grout column 380 such that the lead 452 extends into the soil beyond the grout column 380, as shown in FIG. 31. As a result, the lead 452, which is also carrying the load of the structure the grout column 380 is supporting, induces a restriction to the axial elongation of the grout column 380, and the helical plates 458 impose a resiliency on the grout column 380 to cause the grout column 380 to return to its original position or to a point substantially close to its original position during the temperature variations.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A helical pile comprising:
   a terminating extension shaft having a proximal end, a distal end and a cavity extending along at least a portion of an interior of the terminating extension shaft;
   at least one shaft having a proximal end attachable to the distal end of the terminating extension shaft, a distal end and a cavity extending along at least a portion of an interior of the at least one shaft;
   at least one helical load bearing plate secured to the distal end of the at least one shaft;
   a first tube extendable through the cavity in the terminating extension shaft and into the cavity of the at least one shaft a first predetermined distance;
   a second tube extendable through the cavity in the terminating extension shaft and into the cavity of the at least one shaft a second predetermined distance; and
   a mounting bracket assembly having:
      a pile adapter including a pile receiving flange that can be mated with the proximal end of the terminating extension shaft, and a central aperture aligned with the pile receiving flange that permits the first and second tubes to pass through the pile adapter;
      a bracket assembly having a mounting bracket capable of supporting at least a portion of a structure and at least one mounting plate secured to the mounting bracket and used to secure the mounting bracket assembly to the pile adapter; and
      a bracket stabilizing assembly used to fix the orientation of the bracket assembly relative to the extension shaft;
   wherein the cavity in the at least one shaft can be sealed except for the first tube and the second tube, such that when the helical pile is driven into soil, fluid can be circulated between the first tube, the cavity and the second tube so that heat can be exchanged between the fluid and the soil.

2. The helical pile according to claim 1, wherein the first predetermined distance is adjacent the distal end of the shaft, and the second predetermined distance is adjacent the proximal end of the shaft.

3. The helical pile according to claim 1, wherein the first predetermined distance is greater than the second predetermined distance.

4. The helical pile according to claim 1, further comprising one or more baffles positioned within the cavity and in thermal communication with the shaft so as to increase the surface area of material that can exchange heat with the fluid flowing through the cavity.

5. A geothermal exchange system comprising:
   a thermal exchanging system; and
   at least one helical pile in fluid communication with the thermal exchanging system, the at least one helical pile including:
      a terminating extension shaft having a proximal end, a distal end and a cavity extending along at least a portion of an interior of the terminating extension shaft;
      at least one shaft having a proximal end attachable to the distal end of the terminating extension shaft, a distal end and a cavity extending along at least a portion of an interior of the at least one shaft;
      at least one helical load bearing plate secured to the at least one shaft;
      a first tube extendable through the cavity in the terminating extension shaft and into the cavity of the at least one shaft a first predetermined distance; and
      a second tube extendable through the cavity in the terminating extension shaft and into the cavity of the at least one shaft a second predetermined distance; and
   a mounting bracket assembly including:
      a pile adapter having a pile receiving flange that can be mated with the proximal end of the terminating extension shaft, and a central aperture aligned with the pile receiving flange that permits the first and second tubes to pass through the pile adapter;
      a bracket assembly having a mounting bracket capable of supporting at least a portion of a structure and at least one mounting plate secured to the mounting bracket and used to secure the mounting bracket assembly to the pile adapter; and
      a bracket stabilizing assembly used to fix the orientation of the bracket assembly relative to the terminating shaft;
   wherein a second end of the first tube and a second end of the second tube are connected to the thermal exchanging system; and
   wherein the cavity in the at least one shaft can be sealed except for the first tube and the second tube, such that when the helical pile is driven into soil, fluid can be circulated from the thermal exchanging system through the first tube, the cavity and the second tube so that heat can be exchanged between the fluid and the soil, and the fluid can be returned to the thermal exchanging system through the second tube.

6. The geothermal exchange system according to claim 5, wherein the first predetermined distance is adjacent the distal end of the shaft, and the second predetermined distance is adjacent the proximal end of the shaft.

7. The geothermal exchange system according to claim 5, wherein the first predetermined distance is greater than the second predetermined distance.

8. The geothermal exchange system according to claim 5, further comprising one or more baffles positioned within the cavity and in thermal communication with the shaft so as to increase the surface area of material that can exchange heat with the fluid flowing through the cavity.

9. A helical pile comprising:
   at least one shaft having a proximal end, a distal end, a cavity extending along at least a portion of an interior of the shaft, and at least one helical load bearing plate secured to the shaft;
   a first tube extendable into the proximal end of the at least one shaft and into the cavity a first predetermined distance;

a second tube extendable into the proximal end of the at least one shaft and into the cavity a second predetermined distance; and a mounting bracket assembly adapted to be mated to the proximal end of the at least one shaft, the mounting bracket assembly includes:

a pile adapter having a pile receiving flange that can be mated with the proximal end of the at least one shaft;

a bracket assembly having a mounting bracket capable of supporting at least a portion of a structure and at least one mounting plate secured to the mounting bracket and used to secure the mounting bracket assembly to the pile adapter; and a bracket stabilizing assembly used to fix the orientation of the bracket assembly relative to the at least one shaft.

10. The helical pile according to claim 9, wherein the first predetermined distance is adjacent the distal end of the shaft, and the second predetermined distance is adjacent the proximal end of the shaft.

11. The helical pile according to claim 9, wherein the first predetermined distance is greater than the second predetermined distance.

12. The helical pile according to claim 9, further comprising one or more baffles positioned within the cavity and in thermal communication with the shaft so as to increase the surface area of material that can exchange heat with the fluid flowing through the cavity.

13. The helical pile according to claim 9, wherein the pile adapter includes a central aperture that is aligned with the pile receiving flange that permits the first and second tubes to pass through the pile adapter.

14. The helical pile according to claim 9, wherein the bracket stabilizing assembly includes a pair of bracket support arms coupled to the mounting bracket.

15. A geothermal exchange system comprising:

a thermal exchanging system; and at least one helical pile in fluid communication with the thermal exchanging system, the at least one helical pile including:

at least one shaft having a proximal end, a distal end, a cavity extending along at least a portion of an interior of the shaft, and at least one helical load bearing plate secured to the shaft;

a first tube extending a first predetermined distance into the cavity;

a second tube extending a second predetermined distance into the cavity; and a mounting bracket assembly adapted to be mated to the proximal end of the at least one shaft, the mounting bracket assembly includes:

a pile adapter having a pile receiving flange that can be mated with the proximal end of the at least one shaft;

a bracket assembly having a mounting bracket capable of supporting at least a portion of a structure and at least one mounting plate secured to the mounting bracket and used to secure the mounting bracket assembly to the pile adapter; and a bracket stabilizing assembly used to fix the orientation of the bracket assembly relative to the at least one shaft.

16. The geothermal exchange system according to claim 15, wherein the first predetermined distance is adjacent the distal end of the shaft, and the second predetermined distance is adjacent the proximal end of the shaft.

17. The geothermal exchange system according to claim 15, wherein the first predetermined distance is greater than the second predetermined distance.

18. The geothermal exchange system according to claim 15, further comprising one or more baffles positioned within the cavity and in thermal communication with the shaft so as to increase the surface area of material that can exchange heat with the fluid flowing through the cavity.

19. The geothermal exchange system according to claim 15, wherein the pile adapter includes a central aperture that is aligned with the pile receiving flange that permits the first and second tubes to pass through the pile adapter.

20. The geothermal exchange system according to claim 15, wherein the bracket stabilizing assembly includes a pair of bracket support arms coupled to the mounting bracket.

\* \* \* \* \*